United States Patent
Nakai et al.

(10) Patent No.: US 8,121,462 B2
(45) Date of Patent: Feb. 21, 2012

(54) VIDEO EDITION DEVICE AND METHOD

(75) Inventors: Kentaro Nakai, Osaka (JP); Katsuyuki Morita, Osaka (JP); Hidekazu Shimizu, Osaka (JP)

(73) Assignee: Panasonic Corporation, Osaka (JP)

( * ) Notice: Subject to any disclaimer, the term of this patent is extended or adjusted under 35 U.S.C. 154(b) by 1139 days.

(21) Appl. No.: 11/630,037

(22) PCT Filed: Jun. 28, 2005

(86) PCT No.: PCT/JP2005/011853
§ 371 (c)(1),
(2), (4) Date: Nov. 8, 2007

(87) PCT Pub. No.: WO2006/008923
PCT Pub. Date: Jan. 26, 2006

(65) Prior Publication Data
US 2008/0193099 A1  Aug. 14, 2008

(30) Foreign Application Priority Data

Jun. 29, 2004 (JP) .................................. 2004-192149
Aug. 30, 2004 (JP) .................................. 2004-251016

(51) Int. Cl.
G11B 27/00 (2006.01)
(52) U.S. Cl. .................... 386/278; 386/241; 386/290
(58) Field of Classification Search .............. 386/41, 386/52, 241, 290, 278
See application file for complete search history.

(56) References Cited

U.S. PATENT DOCUMENTS 6,122,379 A *  9/2000 Barbir ............................ 380/269
7,779,267 B2 * 8/2010 Chen et al. ..................... 713/185
2002/0019833 A1   2/2002 Hanamoto
2006/0034459 A1* 2/2006 Uchikawa ...................... 380/255
2007/0008568 A1* 1/2007 Senoh ............................ 358/1.14

FOREIGN PATENT DOCUMENTS

| JP | 2000-261754 | 9/2000 |
| JP | 2001-251581 | 9/2001 |
| JP | 2002-142188 | 5/2002 |

OTHER PUBLICATIONS

Kazunori Ueda et al., "A Design of Summary Composition System with Template Scenario", The Institute of Electronics, Information and Communication Engineers, Technical Report of IEICE. DE 99-31 to 61, vol . 99, No. 202, 1999, pp. 13-18 (with partial English translation).

* cited by examiner

Primary Examiner — Kambiz Zand
Assistant Examiner — Imhotep Durham
(74) Attorney, Agent, or Firm — Wenderoth, Lind & Ponack L.L.P.

(57) ABSTRACT

A video editing device 100 includes a partial digest generation unit 102 acquiring first scene specification information, selecting, from a selection table, one or more pieces of identification information in correspondence with a piece of situation information included in the acquired first scene specification information, extracting one or more pieces of the second scene specification information each specifying a second scene matching a type identified by the selected one or more pieces of the identification information and having a storage time closest to the storage time of the first scene. The video edit device also includes a whole digest generation unit 104 extracting, based on the first scene specification information and the extracted one or more pieces of the second scene specification information, the first scene and the specified one or more second scenes from the video stream, and reproducing the extracted scenes.

9 Claims, 23 Drawing Sheets

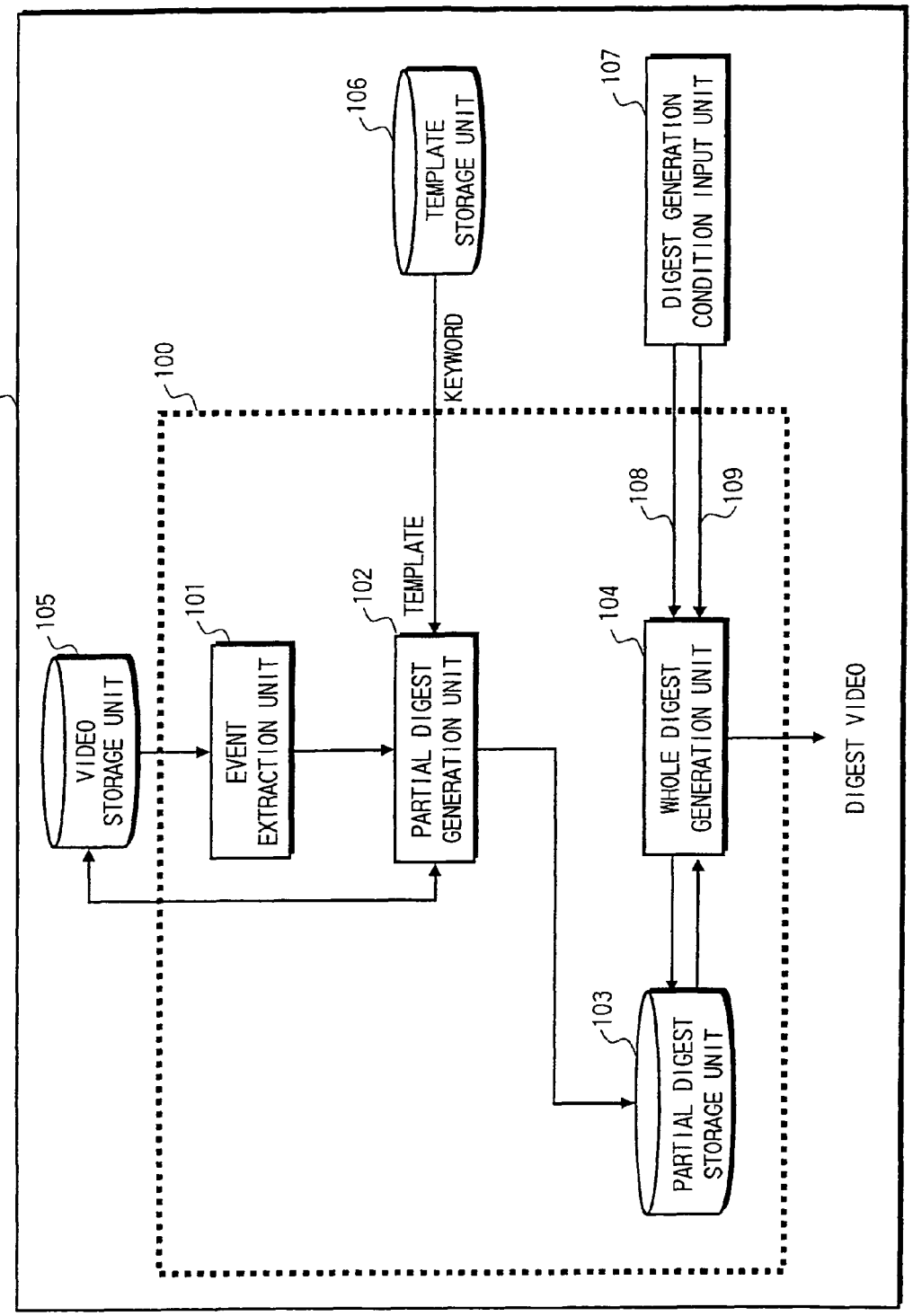

FIG. 2A

600 — HOME RUN (timeline)

FIG. 2B

Table 601:

| INDEX | IN POINT | OUT POINT | CAMERA NUMBER | IMPORTANCE VALUE | OFFENSIVE PLAYER | DEFENSIVE PLAYER | OFFENSIVE TEAM | DEFENSIVE TEAM | TEMPLATE |
|---|---|---|---|---|---|---|---|---|---|
| BASE UP | 4:50 | 4:55 | 2 | 0 | HARAMOTO | YABUHARA | A B C | X Y Z | × |
| HIT | 5:00 | 5:20 | 0 | 8 | NAKAKUBO | YABUHARA | A B C | X Y Z | ○ |
| ... | ... | ... | ... | ... | ... | ... | ... | ... | ... |
| HOME RUN | 10:30 | 11:10 | 0 | 10 | KITAHASHI | EMURA | A B C | X Y Z | ○ |
| HIT | 12:00 | 12:25 | 0 | 2 | HARAMOTO | KAWAMOTO | A B C | X Y Z | ○ |
| HIT | 12:40 | 12:55 | 0 | 5 | KANEYAMA | SHIMOHARA | X Y Z | A B C | ○ |

Columns: 6011 INDEX, 6012 IN POINT, 6013 OUT POINT, 6014 CAMERA NUMBER, 6015 IMPORTANCE VALUE, 6016 OFFENSIVE PLAYER, 6017 DEFENSIVE PLAYER, 6018 OFFENSIVE TEAM, 6019 DEFENSIVE TEAM, 6020 TEMPLATE

FIG. 2C

Table 602:

| EVENT METADATA | CHANCE SITUATION INFORMATION | RESULT SITUATION INFORMATION |
|---|---|---|
| HIT 1 | RUNNERS ON FIRST AND THIRD BASES | CONTRIBUTING TO SCORE, TIMELY HIT, SCORE 1 |
| ... | ... | ... |
| HIT 5 | NO RUNNER ON BASE | CONTRIBUTING TO SCORE, SCORE 1 |
| HIT 2 | NO RUNNER ON BASE | NOT CONTRIBUTING TO SCORE |
| HIT 3 | RUNNER ON THIRD BASE | CONTRIBUTING TO SCORE, CLOSE PLAY, NO SCORE |
| HOME RUN 1 | NO RUNNER ON BASE | SCORE 1 |
| HOME RUN 2 | BASES LOADED | SCORE 4 |
| ... | ... | ... |

(6021 EVENT METADATA, 6022 CHANCE SITUATION INFORMATION, 6023 RESULT SITUATION INFORMATION; rows 1713, 1714, 1715)

FIG. 4

| 801 SCENE ATTRIBUTE INFORMATION | 802 CLASSIFICATION INFORMATION | 803 JUDGMENT STANDARD | 804 PRESENTATION EFFECT INDEX | 1. SITUATION INFORMATION 805 | | | | 2. IMPORTANCE VALUE 806 | | | | |
|---|---|---|---|---|---|---|---|---|---|---|---|---|
| | | | | CHANCE SITUATION INFORMATION | | RESULT SITUATION INFORMATION | | | | | | |
| | | | | RUNNER ON BASE | NO RUNNER ON BASE | CONTRIBUTING TO SCORE | NOT CONTRIBUTING TO SCORE | 1, 2 | 3, 4 | 5, 6 | 7, 8 | 9, 10 |
| BACKGROUND | PLACE SITUATION DESCRIPTION | IMPORTANCE VALUE | AUDIENCE UP | | | | | - | x | x | x | ◎ |
| | CHANCE SITUATION DESCRIPTION | SITUATION | BASE UP | ◎ | x | | | - | - | - | - | - |
| | EVENT DEFENSIVE PLAYER | IMPORTANCE VALUE | PLAYER UP (EVENT DEFENSIVE PLAYER) | | | | | x | ◎ | ◎ | ◎ | ◎ |
| | EVENT OFFENSIVE PLAYER | IMPORTANCE VALUE | PLAYER UP (EVENT OFFENSIVE PLAYER) | | | | | ◎ | ◎ | ◎ | ◎ | ◎ |
| MAIN EVENT | RESULT SITUATION DESCRIPTION | SITUATION | COME HOME | | | ◎ | x | - | - | - | - | - |
| | EVENT DEFENSIVE PLAYER | IMPORTANCE VALUE | PLAYER UP (EVENT DEFENSIVE PLAYER) | | | | | x | x | ◎ | ◎ | ◎ |
| | EVENT OFFENSIVE PLAYER | IMPORTANCE VALUE | PLAYER UP (EVENT OFFENSIVE PLAYER) | | | | | ◎ | ◎ | ◎ | ◎ | ◎ |
| RESULT | PLACE SITUATION DESCRIPTION | SITUATION + IMPORTANCE VALUE | DIRECTOR UP (EVENT DEFENSIVE TEAM) | | | ○ | - | x | x | ○ | ○ | ○ |
| | PLACE SITUATION DESCRIPTION | SITUATION + IMPORTANCE VALUE | DIRECTOR UP (EVENT OFFENSIVE TEAM) | | | ○ | - | x | x | ○ | ○ | ○ |
| | PLACE SITUATION DESCRIPTION | SITUATION + IMPORTANCE VALUE | BENCH PLAYERS (EVENT DEFENSIVE TEAM) | | | ○ | - | x | x | x | ○ | ○ |
| | PLACE SITUATION DESCRIPTION | SITUATION + IMPORTANCE VALUE | CONGRATULATION BY BENCH PLAYERS (EVENT OFFENSIVE TEAM) | | | ○ | - | x | x | x | ○ | ○ |
| | PLACE SITUATION DESCRIPTION | SITUATION + IMPORTANCE VALUE | STAND (EVENT OFFENSIVE TEAM) | | | ○ | - | x | x | x | ○ | ○ |
| | GIVING IMPRESSION | SITUATION + IMPORTANCE VALUE | ANOTHER ANGLE REPLAY | | | ○ | - | x | x | x | x | ○ |
| | GIVING IMPRESSION | SITUATION + IMPORTANCE VALUE | SLOW REPLAY | | | ○ | - | x | x | x | x | ○ |

FIG.5

| | PARTIAL DIGEST METADATA (1000) | PATH (1002) | MAIN INDEX (1003) | RECORDING TIME PERIOD (1004) | REPRODUCTION ORDER (1005) | | IMPORTANCE VALUE (1006) | KEYWORD (1007) |
|---|---|---|---|---|---|---|---|---|
| 1008 | HOME RUN | D:Parts/HR.Dig | HOME RUN | 30:15—35:00 | 1<br>2<br>3<br>4<br>5<br>6 | BASE UP<br>HOME RUN<br>COME HOME<br>PLAYER UP<br>AUDIENCE UP<br>CONGRATULATION | 7 | A B C<br>YAMAOKA<br>TOMOTO,<br>AUDIENCE |
| 1009 | HIT | D:Parts/Single.Dig | HIT | 40:10—42:10 | 1<br>2 | HIT<br>PLAYER UP | 5 | XYZ<br>OHARA |
| | ..... | ..... | ..... | ..... | ..... | ..... | ..... | ..... |
| 1010 | HIT BY PITCH | D:Parts/Dead.Dig | HIT BY PITCH | 62:10—62:50 | 1<br>2<br>3 | HIT BY PITCH<br>PITCHER UP<br>BATTER UP | 2 | ABC, XYZ<br>KANEYAMA<br>SHIMOHARA |
| 1011 | GRAND SLAM HOME RUN | D:Parts/GrandSlam.Dig | HOME RUN | 63:30—68:15 | 1<br>2<br>3<br>4<br>5<br>6<br>7 | BASE UP<br>HOME RUN<br>PLAYER UP<br>COME HOME<br>CONGRATULATION<br>AUDIENCE UP<br>PLAYER UP | 10 | ABC<br>OYAMA<br>KUROHOSHI,<br>MORIMOTO,<br>KANEYAMA |
| 1012 | STRIKE OUT | D:Parts/StriKeOut.Dig | STRIKE OUT SWINGING | 89:30—90:10 | 1<br>2<br>3 | PITCHER UP<br>STRIKE OUT SWINGING<br>BATTER UP | 3 | ABC<br>YAMAOKA |

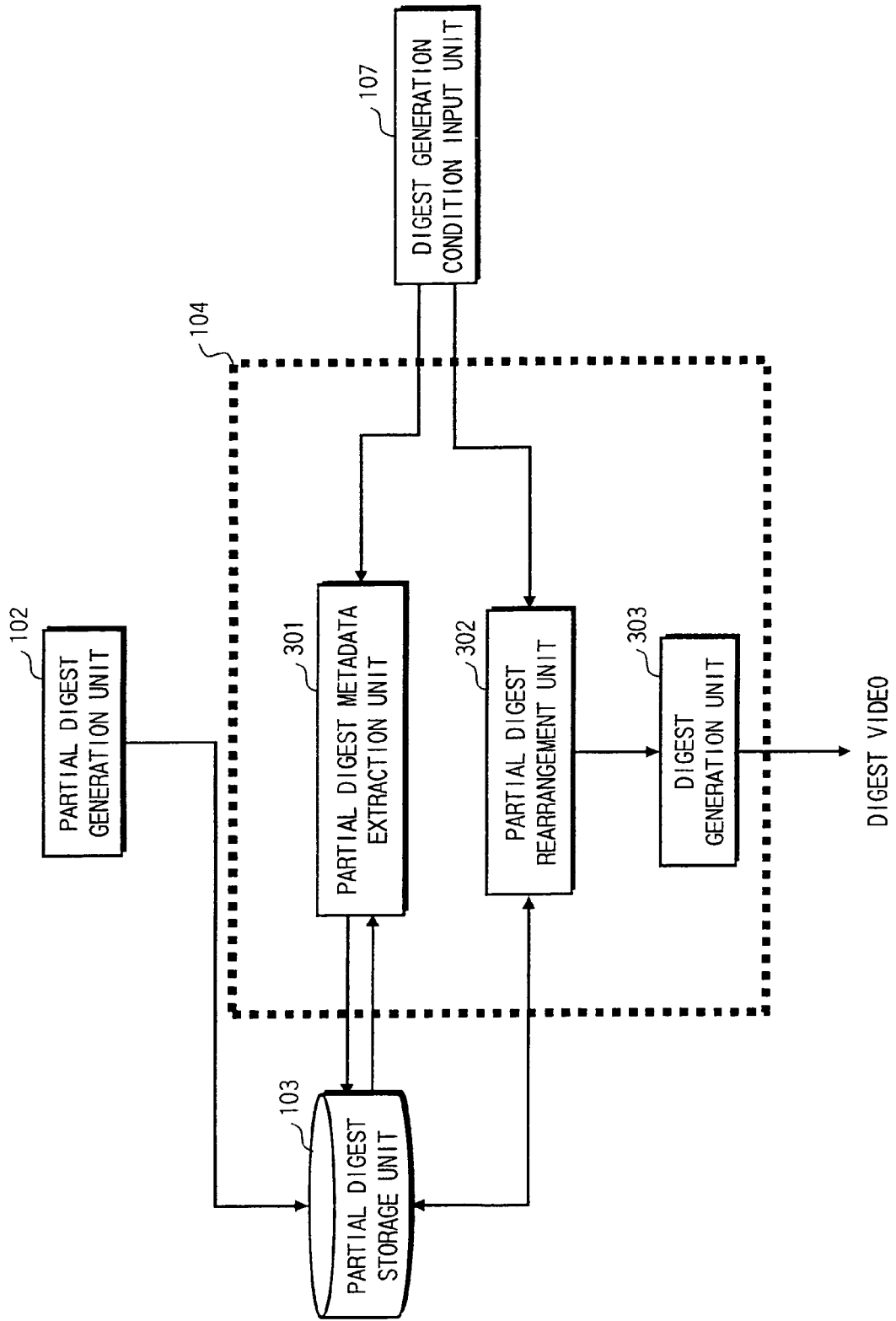

FIG. 7

| BASE UP | 28 : 15 | 28 : 25 |
|---|---|---|
| HOME RUN | 30 : 15 | 35 : 00 |
| COME HOME | 35 : 00 | 35 : 20 |
| PLAYER UP | 35 : 25 | 35 : 35 |
| AUDIENCE UP | 36 : 00 | 36 : 10 |
| CONGRATULATION | 35 : 20 | 35 : 30 |

FIG. 8

| GRAND SLAM HOME RUN | | |
|---|---|---|
| BASE UP | 63 : 10 | 63 : 20 |
| HOME RUN | 63 : 30 | 68 : 15 |
| PLAYER UP | 68 : 15 | 68 : 20 |
| COME HOME | 68 : 10 | 68 : 15 |
| CONGRATULATION | 68 : 20 | 68 : 30 |
| AUDIENCE UP | 68 : 40 | 68 : 45 |
| PLAYER UP | 68 : 30 | 68 : 35 |

| HOME RUN | | |
|---|---|---|
| BASE UP | 28 : 15 | 28 : 25 |
| HOME RUN | 30 : 15 | 35 : 00 |
| COME HOME | 35 : 00 | 35 : 20 |
| PLAYER UP | 35 : 25 | 35 : 35 |
| AUDIENCE UP | 36 : 00 | 36 : 10 |
| CONGRATULATION | 35 : 20 | 35 : 30 |

FIG. 20

| HOME RUN | | |
|---|---|---|
| BASE UP | 28 : 15 | 28 : 25 |
| HOME RUN | 31 : 50 | 35 : 00 |
| COME HOME | 35 : 00 | 35 : 20 |
| PLAYER UP | 35 : 25 | 35 : 35 |
| AUDIENCE UP | 36 : 00 | 36 : 10 |
| CONGRATULATION | 35 : 20 | 35 : 30 |

⋮

| HIT | | |
|---|---|---|
| HIT | 40 : 10 | 42 : 10 |
| PLAYER UP | 42 : 20 | 42 : 30 |

⋮

| GRAND SLAM HOME RUN | | |
|---|---|---|
| BASE UP | 63 : 10 | 63 : 20 |
| HOME RUN | 63 : 30 | 68 : 15 |
| PLAYER UP | 68 : 15 | 68 : 20 |
| COME HOME | 68 : 10 | 68 : 15 |
| CONGRATULATION | 68 : 20 | 68 : 30 |
| AUDIENCE UP | 68 : 40 | 68 : 45 |
| PLAYER UP | 68 : 30 | 63 : 35 |

Table 2001:

| INDEX | PATH OF TEMPLATE |
|---|---|
| HOME RUN | C:Template/HR.Tmpl |
| .... | .... |
| HIT | C:Template/Hit.Tmpl |

Table 2002: TEMPLATE FOR HIT  Hit.Tmpl

| | IN POINT | OUT POINT |
|---|---|---|
| AUDIENCE UP (PLACE SITUATION DESCRIPTION) | | |
| BASE UP (CHANCE SITUATION DESCRIPTION) | | |
| PLAYER UP (EVENT OFFENSIVE PLAYER) | | |
| PLAYER UP (EVENT DEFENSIVE PLAYER) | | |
| HIT | | |
| COME HOME | | |
| PLAYER UP (EVENT DEFENSIVE PLAYER) | | |
| PLAYER UP (EVENT OFFENSIVE PLAYER) | | |
| DIRECTOR UP (EVENT OFFENSIVE TEAM) | | |
| DIRECTOR UP (EVENT DEFENSIVE TEAM) | | |
| BENCH PLAYERS (EVENT DEFENSIVE TEAM) | | |
| CONGRATULATION BY BENCH PLAYERS (EVENT OFFENSIVE TEAM) | | |
| STAND (PLACE SITUATION DESCRIPTION) | | |
| ANOTHER ANGLE REPLAY (GIVING IMPRESSION) | | |
| SLOW REPLAY (GIVING IMPRESSION) | | |

FIG. 22

| BASE UP (CHANCE SITUATION DESCRIPTION) | 4:50 | 4:55 |
| --- | --- | --- |
| PLAYER UP (EVENT OFFENSIVE PLAYER) | 4:55 | 5:00 |
| PLAYER UP (EVENT DEFENSIVE PLAYER) | 4:55 | 5:00 |
| HIT | 5:00 | 5:20 |
| COME HOME | 5:25 | 5:30 |
| PLAYER UP (EVENT DEFENSIVE PLAYER) | 5:30 | 5:35 |
| PLAYER UP (EVENT OFFENSIVE PLAYER) | 5:30 | 5:35 |
| DIRECTOR UP (EVENT OFFENSIVE TEAM) | 5:30 | 5:35 |
| DIRECTOR UP (EVENT DEFENSIVE TEAM) | 5:30 | 5:35 |
| BENCH PLAYERS (EVENT DEFENSIVE TEAM) | 5:35 | 5:40 |
| CONGRATULATION BY BENCH PLAYERS (EVENT OFFENSIVE TEAM) | 5:35 | 5:40 |
| STAND (PLACE SITUATION DESCRIPTION) | 5:35 | 5:40 |

FIG. 23

| PLAYER UP (EVENT OFFENSIVE PLAYER) | 11:50 | 11:55 |
| --- | --- | --- |
| HIT | 12:00 | 12:25 |
| PLAYER UP (EVENT OFFENSIVE PLAYER) | 12:30 | 12:35 |

FIG. 24

| BASE UP | 12:30 | 12:35 |
| --- | --- | --- |
| PLAYER UP (EVENT OFFENSIVE PLAYER) | 12:35 | 12:40 |
| PLAYER UP (EVENT DEFENSIVE PLAYER) | 12:35 | 12:40 |
| HIT | 12:40 | 12:55 |
| COME HOME | 13:00 | 13:05 |
| PLAYER UP (EVENT DEFENSIVE PLAYER) | 13:05 | 13:10 |
| PLAYER UP (EVENT OFFENSIVE PLAYER) | 13:05 | 13:10 |

VIDEO EDITION DEVICE AND METHOD

TECHNICAL FIELD

The present invention relates to an art for editing a recorded video, and particularly to an art for generating a digest video having summarized contents of the recorded video by extracting a specific portion from a video stream of the recorded video.

BACKGROUND ART

As an art for generating a digest video using a recorded video stream, Japanese Patent Application Publication No. 2000-261754 discloses the following art. In accordance with a standard for an importance degree determined by a user, a scene to be included in a digest video is specified among scenes included in the video stream. A portion of the video stream within a predetermined range that includes the specified scene is extracted from the recorded video stream to generate the digest video.

This enables the user to watch only an important portion in a short time period without reproducing the whole recorded video stream.

Also, Japanese Patent Application Publication No. 2002-142188 discloses the following art. A template is preset for specifying a portion extracted from a recorded video stream, for each scene included in the video stream. When a user selects a desired template, a video stream is specified based on the selected template. By extracting a portion from the specified video stream, a digest video is generated.

This enables the user to watch a desired scene in a short time period by selecting a desired template.

DISCLOSURE OF THE INVENTION

The Problems the Invention is Going to Solve

However, in the above-mentioned conventional arts, a range and a reproduction order of a video stream to be reproduced are fixed for each scene. Accordingly, if scenes that belong to a same type appear a plurality of times in a recorded video stream, the scenes are each reproduced in a fixed reproduction order. This causes a problem that digest videos using the scenes are uninteresting and uneventful, and give viewers unsatisfactory impressions.

For example, in the case where digest videos respectively relating to a scene that shows a solo home run, a scene that shows a come-from-behind home run, and a scene that shows a grand slam home run a home run in a baseball game are reproduced, all the scenes are reproduced in a same way. Therefore, there occurs a problem that varied digest videos that attract viewers' interests cannot be generated.

In view of the above problem, the present invention aims to provide a video editing device and method that can generate a digest video having a different presentation effect in accordance with a situation of a scene relating to an important scene.

Means for Solving the Problem

In order to solve the above problem, the present invention is a video editing device that extracts a specific scene among a plurality of scenes included in a video stream stored in a storage medium, and reproduces the extracted specific scene, wherein the plurality of scenes include: a first scene as a main scene; and a plurality of types of second scenes for increasing a presentation effect of the first scene, the storage medium has stored therein: (i) first scene specification information specifying the first scene and including time information that shows a storage position of the first scene as a storage time, and pieces of situation information that each shows a situation of a scene relating to the first scene; (ii) a plurality of pieces of second scene specification information each specifying one of the second scenes and including time information that shows a storage position of the one of the second scenes as a storage time, and pieces of identification information each identifying one of the types; and (iii) a selection table that shows a correspondence between the pieces of situation information and the pieces of identification information, the video editing device comprises: an acquisition unit operable to acquire the first scene specification information; a selection unit operable to select, from the selection table, one or more pieces of the identification information in correspondence with a piece of the situation information included in the acquired first scene specification information; and an extraction unit operable to extract one or more pieces of the second scene specification information each specifying a second scene that matches a type identified by the selected one or more pieces of the identification information and has a storage time closest to the storage time of the first scene.

A video editing method that extracts a specific scene among a plurality of scenes included in a video stream stored in a storage medium, and reproduces the extracted specific scene, wherein the plurality of scenes may include: a first scene as a main scene; and a plurality of types of second scenes for increasing a presentation effect of the first scene, the storage medium may have stored therein: (i) first scene specification information specifying the first scene and including time information that shows a storage position of the first scene as a storage time, and pieces of situation information that each shows a situation of a scene relating to the first scene; (ii) a plurality of pieces of second scene specification information each specifying one of the second scenes and including time information that shows a storage position of the one of the second scenes as a storage time, and pieces of identification information each identifying one of the types; and (iii) a selection table that shows a correspondence between the pieces of situation information and the pieces of identification information, the video editing method may comprise the steps of: acquiring the first scene specification information; selecting, from the selection table, one or more pieces of the identification information in correspondence with a piece of the situation information included in the acquired first scene specification information; and extracting one or more pieces of the second scene specification information each specifying a second scene that matches a type identified by the selected one or more pieces of the identification information and has a storage time closest to the storage time of the first scene.

A program that causes a video editing device to perform video editing processing, the video editing device extracting a specific scene among a plurality of scenes included in a video stream stored in a storage medium and reproducing the extracted specific scene, wherein the plurality of scenes may include: a first scene as a main scene; and a plurality of types of second scenes for increasing a presentation effect of the first scene, the storage medium may have stored therein: (i) first scene specification information specifying the first scene and including time information that shows a storage position of the first scene as a storage time, and pieces of situation information that each shows a situation of a scene relating to the first scene; (ii) a plurality of pieces of second scene specification information each specifying one of the second scenes and including time information that shows a storage position of the one of the second scenes as a storage time, and pieces of identification information each identifying one of the types; and (iii) a selection table that shows a correspondence between the pieces of situation information and the pieces of identification information, the video editing processing may comprise the steps of: acquiring the first scene specification information; selecting, from the selection table, one or more pieces of the identification information in correspondence with a piece of the situation information included in the acquired first scene specification information; and extracting one or more pieces of the second scene specification information each specifying a second scene that matches a type identified by the selected one or more pieces of the identification information and has a storage time closest to the storage time of the first scene.

A computer readable storage medium that has stored therein a program that causes a video editing device to perform video editing processing, the video editing device extracting a specific scene among a plurality of scenes included in a video stream stored in a storage medium and reproducing the extracted specific scene, wherein the plurality of scenes may include: a first scene as a main scene; and a plurality of types of second scenes for increasing a presentation effect of the first scene, the storage medium may have stored therein: (i) first scene specification information specifying the first scene and including time information that shows a storage position of the first scene as a storage time, and pieces of situation information that each shows a situation of a scene relating to the first scene; (ii) a plurality of pieces of second scene specification information each specifying one of the second scenes and including time information that shows a storage position of the one of the second scenes as a storage time, and pieces of identification information each identifying one of the types; and (iii) a selection table that shows a correspondence between the pieces of situation information and the pieces of identification information, the video editing processing may comprise the steps of: acquiring the first scene specification information; selecting, from the selection table, one or more pieces of the identification information in correspondence with a piece of the situation information included in the acquired first scene specification information; and extracting one or more pieces of the second scene specification information each specifying a second scene that matches a type identified by the selected one or more pieces of the identification information and has a storage time closest to the storage time of the first scene.

Effect of the Invention

With the above structure, based on one piece of situation information included in first scene specification information, one or more pieces of second scene specification information are selected for each specifying a presentation effect scene relating to the main scene to be reproduced together with a main scene. Accordingly, by extracting the main scene and the one or more presentation effect scenes for increasing the presentation effect of the main scene based on the piece of first scene specification information and the selected one or more pieces of second scene specification information, a user can enjoy watching a digest video in accordance with a situation of a scene relating to the main scene.

Here, the storage medium may have stored therein template information that shows a reproduction order of the first scene and the plurality of types of second scenes, in correspondence with the first scene specification information, and the video editing device may further comprise a reproduction unit operable to, based on the first scene specification information and the extracted one or more pieces of the second scene specification information, extract the first scene and the specified one or more second scenes from the video stream, and reproduce the first scene and the specified one or more second scenes in accordance with the reproduction order.

With the above structure, a reproduction order of a main scene and one or more presentation effect scenes relating to the main scene can be set beforehand. Accordingly, a main scene and one or more presentation effect scenes effectively boosting the main scene can be reproduced in an effective reproduction order that can increase the presentation effect of the main scene as much as possible.

Here, the video stream includes a plurality of first scenes, the storage medium has stored therein: a plurality of pieces of first scene specification information; and a plurality of pieces of template information respectively corresponding to the pieces of first scene specification information, each time the acquisition unit acquires a piece of the first scene specification information, the selection unit selects, from the selection table, one or more pieces of the identification information each identifying a type of a second scene in correspondence with a piece of situation information included in the acquired piece of the first scene specification information, and the extraction unit extracts one or more pieces of the second scene specification information each specifying a second scene that matches a type identified by the selected one or more pieces of the identification information and has a storage time closest to a storage time of a first scene identified by the acquired piece of the first scene specification information, the reproduction unit includes: a generation subunit operable to generate partial index information that includes time information included in the acquired piece of the first scene specification information, time information included in the extracted piece of the second scene specification information, and template information corresponding to the acquired piece of the first scene specification information; a storage subunit operable to store the generated partial index information; and a stream reproduction subunit operable to read the partial index information from the storage subunit in accordance with a user's instruction, extract the first scene and the one or more second scenes from the video stream based on the read partial index information, and reproduce the first scene and the one or more second scenes.

With the above structure, pieces of second video specification information each specifying a presentation effect scene is selected for each piece of first scene specification information. Accordingly, even if the user designates reproduction of a digest video including a plurality of same types of main scenes, a type of a presentation effect scene to be reproduced with each main scene is different. Therefore, the user can enjoy watching a digest video without getting bored.

Here, the situation information may show a situation of a scene immediately before the first scene.

With the above structure, a type of a presentation effect scene to be reproduced with a main scene can be selected in accordance with a situation of a scene immediately before the main scene. Accordingly, for example, suppose the case where a digest video is reproduced using as a main scene, a scene that shows a hit in a live broadcasting of a base ball game. If a runner is on a base immediately before the hit, a scene that shows a situation of the runner is reproduced with the scene that shows the hit. If the runner is not on the base immediately before the hit, only the scene that shows the hit is reproduced. In this way, in accordance with a situation of a scene immediately before a main scene, a digest video can be effectively edited and reproduced so as to attract viewers' interests.

Here, the situation information may show a situation of a scene that shows a result based on the first scene.

With the above structure, a presentation effect can be increased in accordance with a situation of a result scene based on the main scene. For example, suppose the case where digest videos are reproduced respectively relating to a scene that shows a grand slam home run and a scene that shows a solo home run with no runner on base, as a main scene in a live broadcasting of a baseball game. In comparison with the case the scene that shows the solo home run, many presentation effect scenes are reproduced together with the scene that shows the grand slam home run (for example, a scene that shows a situation of bench players who celebrate the grand slam home run, a scene that shows a situation of audience who gets excited, a repeated scene that shows the grand slam home run), and therefore a presentation effect of the scene that shows the grand slam home run can be increased.

Here, the storage medium may have stored therein a plurality of types of video streams each having added thereto a piece of stream identification information identifying one of the video streams, the first scene specification information may include stream identification information identifying one of the video streams having stored therein the first scene, the plurality of pieces of the second scene specification information may each include stream identification information identifying one of the video streams having stored therein one of the second scenes, and the reproduction unit may extract the identified first scene from the identified video stream having the piece of the stream identification information included in the first scene specification information, and extract the second scene from the video stream having the piece of the stream identification information included in the second scene specification information.

With the above structure, one or more presentation effect scenes to be reproduced together with a main scene are selected among a plurality of video streams. Accordingly, the user can enjoy watching one or more presentation effect scenes photographed from multi-angles using a plurality of cameras.

Here, a video editing device that extracts a specific scene among a plurality of scenes included in a video stream stored in a storage medium, and reproduces the extracted specific scene, wherein the plurality of scenes include: a first scene as a main scene; and a plurality of types of second scenes for increasing a presentation effect of the first scene, the storage medium has stored therein: (i) first scene specification information specifying the first scene and including time information that shows a storage position of the first scene as a storage time, and importance degree information showing an importance degree of the first scene; (ii) a plurality of pieces of second scene specification information each specifying one of the second scenes and including time information that shows a storage position of the one of the second scenes as a storage time, and pieces of identification information each identifying one of the types; and (iii) a selection table that shows a correspondence between pieces of importance degree information and the pieces of identification information, the video editing device comprises: an acquisition unit operable to acquire the first scene specification information; a selection unit operable to select, from the selection table, one or more pieces of the identification information in correspondence with the importance degree information; and an extraction unit operable to extract one or more pieces of the second scene specification information each specifying a second scene that matches a type identified by the selected one or more pieces of the identification information and has a storage time closest to the storage time of the first scene.

With the above structure, a presentation effect can be varied in accordance with an importance value of a main scene shown by first scene specification information.

For example, suppose the case where digest videos are reproduced respectively relating to a scene that shows a reverse timely hit and a scene that shows a normal timely hit as a main scene in a live broadcasting of a baseball game. A difference in importance value is set between a timely hit and a normal timely hit. In the case of the reverse timely hit, a scene that shows a situation of bench players who celebrate the timely hit and a scene that shows a situation of audience who gets excited are reproduced together with the scene that shows the timely hit being a main scene. In the case of the normal timely hit, such presentation effect scene is not reproduced. By setting reproduction of scenes in this way, a presentation effect can be varied.

BRIEF DESCRIPTION OF THE DRAWINGS

FIG. 1 is a functional block diagram showing a structure of a video editing system 10 in an embodiment of the present invention;

FIG. 2A, FIG. 2B, and FIG. 2C show specific examples of a video stream, event metadata, and situation information that are stored in the video storage unit 105, respectively;

FIG. 4 shows a specific example of a presentation effect matching table;

FIG. 5 shows a specific example of attribute data;

FIG. 6 is a functional block diagram showing a structure of a whole digest generation unit 104;

FIG. 7 shows a specific example of partial digest metadata extracted from attribute data;

FIG. 8 shows a specific example of whole digest metadata;

FIG. 20 shows a specific example of whole digest metadata;

FIG. 21 shows specific examples of a matching table and a template for hit, which are stored in a template storage unit 106;

FIG. 22 shows a specific example of partial digest metadata generated with respect to main metadata including an index "hit" shown by numerical reference 1710 in FIG. 2B;

FIG. 23 shows a specific example of partial digest metadata generated with respect to main metadata including an index "hit" shown by numerical reference 1711 in FIG. 2B; and FIG. 24 shows a specific example of partial digest metadata generated with respect to main metadata including an index "hit" shown by numerical reference 1712 in FIG. 2B.

BEST MODE FOR CARRYING OUT THE INVENTION

Structure

Figure 3:
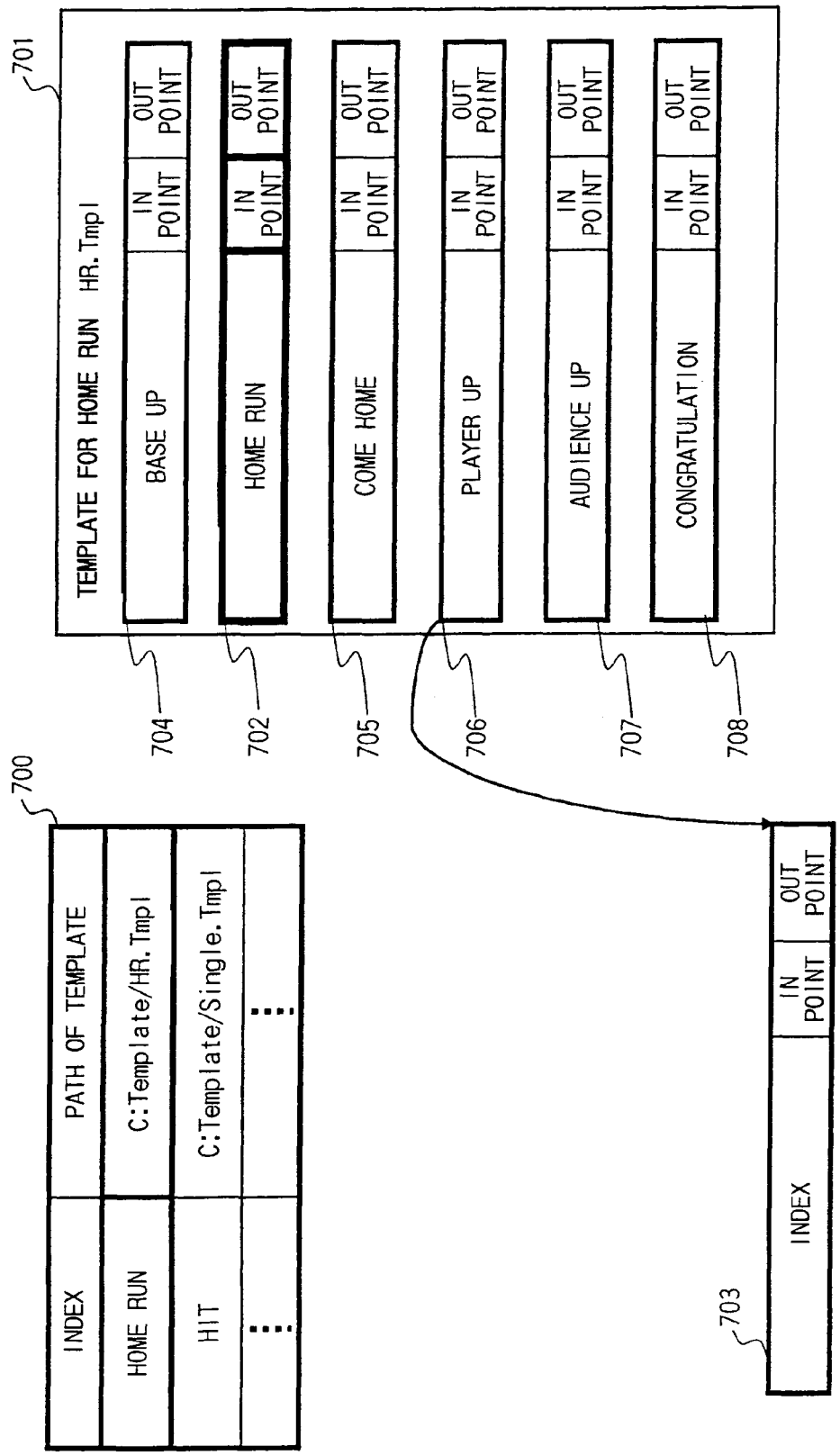
FIG. 3 shows specific examples of a matching table and a template.

FIG. 1 is a functional block diagram showing a structure of a video editing system 10 in an embodiment of the present invention.

The video editing system 10 includes a video editing device 100, a video storage unit 105, a template storage unit 106, and a digest generation condition input unit 107.

The video editing device 100 is connected with the video storage unit 105, the template storage unit 106, and the digest generation condition input unit 107 via electric telecommunication lines (for example, Internet, intranet, LAN, etc.).

Moreover, the video editing device 100 may include, as built-in units, the video storage unit 105, the template storage unit 106, and the digest generation condition input unit 107.
(Video Storage Unit 105)

The video storage unit 105 stores a video stream that is a time-series stream of frame images photographed in a broadcasting station for broadcast programs, a plurality of pieces of event metadata, and situation information. Each piece of video data that constitutes the video stream is recorded in correspondence with a recording time thereof.

In addition, the video stream stored in the video storage unit 105 may be a plurality of types of video streams photographed by a plurality of cameras. In this case, a camera number for identifying each video stream is added to the video stream, as an identifier.

Here, "event metadata" indicates information that shows a correspondence among the followings in the case where the photographed video stream is divided into a plurality of streams composed of a predetermined number of time-series continuous frame images: an "index" for classifying a scene shown by each divided stream; an "IN point" that shows a recording start time of the scene; an "OUT point" that shows a recording end time of the scene; a "camera number" for identifying a camera that has photographed the scene; an "importance value" as a value that shows a degree of importance of the scene in a group of scenes; a "keyword" having a detail description of the scene (for example, a character, a subject name, etc.); and "template information" that shows whether a template (described later) corresponding to the scene exists.

Note that, since a subject of photography in the embodiment is a baseball game, keywords are classified into an "offensive player", a "defensive player", an "offensive team", and a "defensive team".

Here, in the baseball game, the "offensive player" indicates a batter on the offensive side, and the "defensive player" indicates a pitcher on the defensive side. The "offensive team" indicates a team on the offensive side, and the "defensive team" indicates a team on the defensive side.

A piece of event metadata is stored in the video storage unit 105 each time photography of a scene shown by an index is completed.

Moreover, "situation information" indicates information having a description of a situation of a scene immediately before a scene shown by a piece of event metadata and a description of a situation of a result scene based on the scene shown by the piece of event metadata (hereinafter, information having a description of the former situation is referred to as "chance situation information", and information having a description of the latter situation is referred to as "result situation information").

Situation information is created by an editor of a photographed video, a cameraman, or an assistant of the cameraman, etc., for example.

Situation information may be created on demand while photographing the video, or when editing the photographed video.

FIG. 2A, FIG. 2B, and FIG. 2C show specific examples of a video stream, event metadata, and situation information that are stored in the video storage unit 105, respectively.

In FIG. 2A, numerical reference 600 represents a video stream.

In FIG. 2B, numerical reference 601 represents event metadata. Numerical references 6011 to 6015 represent specific examples of an index, an IN point, an OUT point, a camera number, and an importance value, respectively. Also, numerical references 6016 to 6019 represent specific examples of a keyword (an offensive player, a defensive player, an offensive team, and a defensive team), respectively. Numerical reference 6020 represents a specific example of template information.

Also, in FIG. 2C, numerical reference 602 represents a specific example of situation information. Numerical references 6021 to 6023 represent specific examples of an event metadata identifier, chance situation information, and result situation information, respectively.
(Template Storage Unit 106)

The template storage unit 106 stores a matching table, a template, and a presentation effect matching table.

Here, the "matching table" indicates a table that shows a correspondence between an index (hereinafter "main index") that belongs to a piece of event metadata having a template (hereinafter "main metadata") and a storage location of the template to which the main index belongs.

Also, the "template" indicates information that includes a group of indexes for classifying a plurality of scenes to be sequentially reproduced in a digest video, a recording field of a recording time information (IN point and OUT point) of a scene classified by the index, and a reproduction order of the scene. Hereinafter, an index other than a main index included in the group is referred to as a "presentation effect index".

In addition, in the recording field of the recording time information included in the template, an IN point and an OUT point are recorded upon the later-described generation of partial digest metadata.

Here, the "presentation effect index" indicates an index for classifying scenes that relate to a main scene classified by the main index, from among photographed scenes. The scenes that relate to the main scene are classified into a background scene that relates to the main scene immediately before the main scene and a result scene that relates to the main scene immediately after the main scene.

For example, if a scene "home run" or "hit" in a baseball game is set as a main scene, a background scene includes a scene that shows a runner on base, a scene that shows a situation of audience, a scene that shows a facial expression of a person relating to the main scene, etc., which are immediately before the main scene. Also, a result scene includes a scene that shows a situation of audience, a scene that shows a facial expression of a person relating to the main scene, a scene that shows a situation of bench players, a scene that shows a situation of a director, etc., which are immediately after the main scene.

Note that, with respect to one presentation effect index, a plurality of pieces of event metadata including the presentation effect index exist and are stored in the video storage unit 105 together with a piece of main metadata. In FIG. 2B, numerical reference 1700 shows a specific example of a piece of event metadata that includes a presentation effect index.

In the template, a reproduction order of scenes classified by all presentation effect indexes that each has a possibility to be selected in the later-described index selection processing and main indexes is defined. If a presentation effect index is deleted in the above selection processing, the deleted presentation effect index is skipped, and a scene in a subsequent reproduction order classified by a presentation effect index or a main index is connected to the former scene.

Moreover, if photographing a scene that belongs to each classification using a plurality of cameras, information relating to camera numbers for identifying the cameras is included in the template, in addition to IN points and OUT points of the template. Accordingly, by correlating a plurality of video streams stored in the video storage unit 105 with a camera number of a camera that has photographed the video stream, each video stream relating to a scene photographed by a plurality of cameras can be read from the video storage unit 105 based on template information, and therefore can be reproduced.

Moreover, the "presentation effect matching table" indicates a table that shows a correspondence among scene attribute information, classification information, a judgment standard identifier, a presentation effect index, a situation information judgment identifier, and an importance value judgment identifier.

Here, the "scene attribute information" indicates information that shows whether each presentation effect index of a matching table relates to a background scene that is a scene immediately before a scene identified by a main index, or relates to a result scene that is a scene relating to the main index.

Moreover, the "classification information" indicates information of scene attribute information classified based on an attribute of a photographed subject.

Moreover, the "judgment standard identifier" indicates an identifier that shows judgment whether to add each presentation effect index to a template is performed in accordance with which of the following: a situation information judgment identifier; an importance value judgment identifier; and both of the situation information judgment identifier and the importance value judgment identifier.

Moreover, the "situation information judgment identifier" indicates an identifier for the following judgments with respect to each presentation effect index in accordance with a correspondence of the presentation effect index and situation information of a main index: in a template of the main index, whether to judge as a presentation effect index to be selected, or a presentation effect index to be a selection candidate; and in the template, whether to judge as a presentation effect index to be deleted, or a presentation effect index to be a deletion candidate.

Moreover, the "importance value judgment identifier" indicates an identifier for the following judgments with respect each presentation effect index in accordance with a correspondence of the presentation effect index with an importance value of a scene shown by the piece of main metadata: in a template of the main index, whether to judge as a presentation effect index determined to be selected, or a presentation effect index to be a selection candidate; and in the template, whether to judge as a presentation effect index to be deleted, or a presentation effect index to be a deletion candidate.

In FIG. 3, numerical references 700 and 701 represent specific examples of a matching table and a template, respectively. The matching table represented by the numerical reference 700 shows a correspondence between a "main index" ("index" shown in FIG. 3A) and a "path" that shows a storage location of a template to which the main index belongs.

Also, in the template represented by the numerical reference 701, each index that shows a scene relating to a home run is arranged in accordance with a reproduction order. A recording field for an "IN point" and an "OUT point" that show a recording start time and a recording end time of the scene shown by the index is added to each index.

FIG. 4 shows a specific example of a presentation effect matching table. In FIG. 4, numerical references 801, 802, 803, 804, 805, and 806 represent scene attribute information, classification information, a judgment standard, a presentation effect index, a situation information judgment identifier, and an importance value judgment identifier, respectively.

Moreover, in FIG. 4, a sign "–" shown by a situation information judgment identifier or an importance value judgment identifier in correspondence with a main index indicates that a corresponding presentation effect index is a deletion candidate object in a template to which the main index belongs. A sign "⊚" shown by a situation information judgment identifier or an importance value judgment identifier in correspondence with a main index indicates that a corresponding presentation effect index is a selection determined object in a template to which the main index belongs. A sign "×" shown by a situation information judgment identifier or an importance value judgment identifier in correspondence with a main index indicates that a corresponding presentation effect index is a deletion object in a template to which the main index belongs. A sign "○" shown by a situation information judgment identifier or an importance judgment identifier in correspondence with a main index indicates that a corresponding presentation effect index is a selection candidate object in a template to which the main index belongs.

The use of this presentation effect matching table enables change of predetermined contents of a presentation effect index of a template in accordance with situation information and an importance value of the main index.

(Digest Generation Condition Input Unit 107)

The digest generation condition input unit 107 inputs a condition for generating a digest video (hereinafter "generation condition") to the whole digest generation unit 104.

Here, the "generation condition" indicates a condition that includes a search condition for searching a piece of main metadata as a component of a digest video and a rearrangement condition for designating a reproduction order of pieces of partial digest searched based on the search condition.

Here, the "partial digest metadata" indicates data that includes the following: a presentation effect index selected in the later-described first and second selection processing among from presentation effect indexes included in a template corresponding to a piece of main metadata, an IN point and an OUT point thereof; a main index included in the template, an IN point and an OUT point thereof; and a reproduction order of scenes respectively specified by the main index and the selected presentation effect index.

The search condition includes designations of a main index that belongs to the piece of main metadata, a keyword, and a threshold value of an importance value, etc., for example.

Moreover, the rearrangement condition includes an ascending order of a recording time period of a piece of partial digest metadata specified by the piece of main metadata and a descending order of importance value, for example.

(Video Editing Device 100)

The video editing device 100 includes an event extraction unit 101, a partial digest generation unit 102, a partial digest storage unit 103, and a whole digest generation unit 104.

(Event Extraction Unit 101)

With reference to template information of each piece of event metadata stored in the video storage unit 105, the event extraction unit 101 judges whether a template exists, and extracts a piece of main metadata that has a template. Furthermore, with reference to situation information stored in the video storage unit 105, the event extraction unit 101 extracts a piece of situation information in correspondence with the extracted piece of main metadata, and outputs the extracted piece of situation information to the partial digest generation unit 102.

(Partial Digest Storage Unit 103)

The partial digest storage unit 103 stores partial digest metadata and attribute data that are generated by the partial digest generation unit 102.

Here, the "attribute data" indicates information that shows a correspondence among the following: a name of a piece of partial digest metadata generated by the partial digest generation unit 102 based on information extracted from a piece of event metadata relating to an index that constitutes a piece of partial digest metadata; a partial path that shows a storage location of the piece of partial digest metadata; a main index; a recording time period that shows a range from an IN point showing an earliest recording time among IN points of scenes relating to the piece of partial digest metadata to an OUT point showing a latest recording time among OUT points of the scenes; a reproduction order of a scene classified by an index included in the piece of partial digest metadata; an importance value of the piece of partial digest metadata; and a keyword as for a piece of event metadata relating to the piece of partial digest metadata.

FIG. 5 shows a specific example of attribute data. In FIG. 5, numerical references 1000 to 1007 represent attribute data, a name of partial digest metadata, a partial path, a main index, a recording time period, a reproduction order, an importance value, and a keyword, respectively.

(Whole Digest Generation Unit 104)

FIG. 6 is a functional block diagram showing a structure of the whole digest generation unit 104.

The whole digest generation unit 104 includes a partial digest metadata extraction unit 301, a partial digest rearrangement unit 302, and a digest generation unit 303.

(Partial Digest Metadata Extraction Unit 301)

In accordance with a search condition included in a generation condition input by the digest generation condition input unit 107, the partial digest metadata extraction unit 301 extracts a piece of partial digest metadata that meets the search condition based on the piece of attribute data stored in the partial digest storage unit 103, and outputs the extracted piece of partial digest metadata to the partial digest rearrangement unit 302.

FIG. 7 shows a specific example of partial digest metadata extracted from attribute data. FIG. 7 shows an example of partial digest metadata with respect to "home run" extracted by the partial digest metadata extraction unit 301 based on the attribute data shown in FIG. 5, in the case where a main index as a search condition is specified as "home run".

Moreover, in the case where a keyword as a search condition is specified, the partial digest metadata extraction unit 301 extracts a piece of partial digest metadata (for example, pieces of the partial digest metadata "home run" and "strikeout") including a keyword (for example, "Yamaoka") specified based on the attribute data shown in FIG. 5. In the case where a threshold value of an importance value (for example, a threshold value of an importance value is set as five) as a search condition, the partial digest metadata extraction unit 301 extracts apiece of the partial digest metadata whose importance value is no less than the threshold value five (for example, pieces of the partial digest metadata "home run", "hit", and "grand slam home run") based on the attribute data shown in FIG. 5.

(Partial Digest Rearrangement Unit 302)

In accordance with a reproduction order specified by a rearrangement condition included in the generation condition input by the digest generation condition input unit 107, the partial digest rearrangement unit 302 rearranges the pieces of partial digest metadata input by the partial digest metadata extraction unit 301, and outputs the rearranged pieces of partial digest metadata to the digest generation unit 303.

(Digest Generation Unit 303)

Based on the rearranged pieces of partial digest metadata input by the partial digest rearrangement unit 302, the digest generation unit 303 generates partial digest metadata (hereinafter "whole digest metadata") by connecting the pieces of partial digest metadata in accordance with an order after the rearrangement.

Furthermore, the digest generation unit 303 reproduces a digest video by sequentially reproducing scenes respectively specified by a presentation effect index and a main index specified by the pieces of partial digest metadata included in the whole digest metadata in accordance with the order after the rearrangement, in accordance with the reproduction order shown by the partial digest metadata.

Specifically, in accordance with the reproduction order shown by the partial digest metadata, the digest generation unit 303 reproduces a digest video by sequentially extracting a corresponding video stream from the video storage unit 105 based on an IN point and an OUT point (and a camera number if included) with respect to the index included in the partial digest metadata, and reproducing the extracted video stream.

FIG. 8 to FIG. 10, and FIG. 20 each shows a specific example of whole digest metadata. FIG. 8 shows the specific example of whole digest metadata generated in the case where search in the attribute data shown in FIG. 5 is performed by setting "home run" as a main index, and setting a descending order of "importance value" as a rearrangement order.

Figure 18:
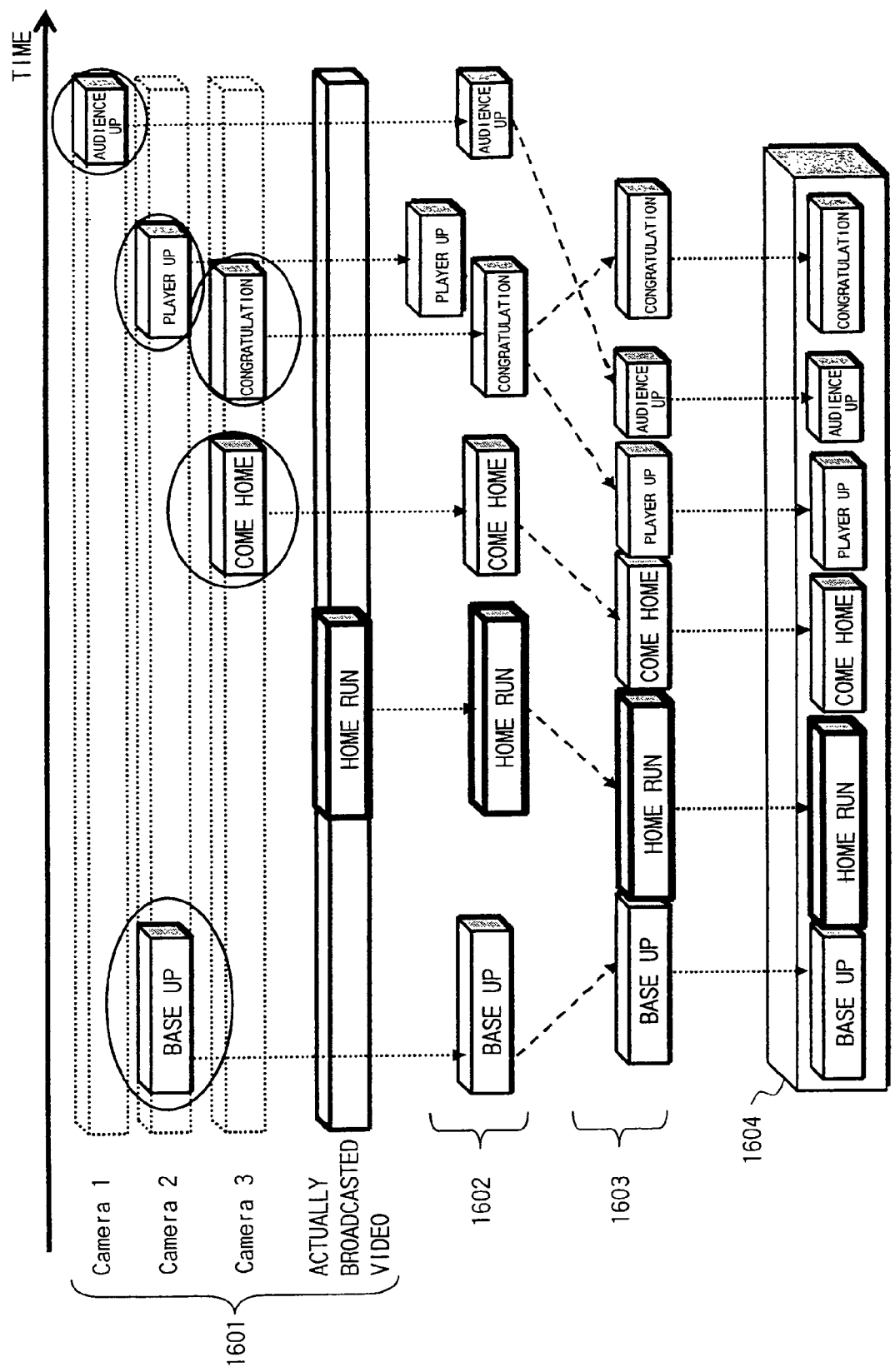
FIG. 18 shows a part of a process of digest video reproduction performed by a digest generation unit 303 based on the whole digest metadata shown in FIG. 8.

Also, FIG. 18 shows a part of a process of digest video reproduction based on the whole digest metadata shown in FIG. 8. Specifically, FIG. 18 shows a part of a process of digest video reproduction performed by the digest generation unit 303 based on a piece of partial digest metadata corresponding to "home run" finally shown in FIG. 8.

In FIG. 18, numerical reference 1601 represents a video stream of a photographed video of the baseball game stored in the video storage unit 105, and indicates that four types of video streams are photographed by a plurality of cameras, and are stored in the video storage unit 105.

Numerical reference 1602 represents a video stream corresponding to indexes extracted by the digest generation unit 303 from the video stream represented by the numerical reference 1601, based on an IN point, an OUT point, and a camera number of each index included in a piece of partial digest metadata "home run".

Numerical reference 1603 represents a video stream generated by rearranging each extracted video stream in accordance with a reproduction order shown by the piece of partial digest metadata "home run".

Numerical reference 1604 describes a digest video reproduced based on the video stream generated by the digest generation unit 303.

Figure 9:
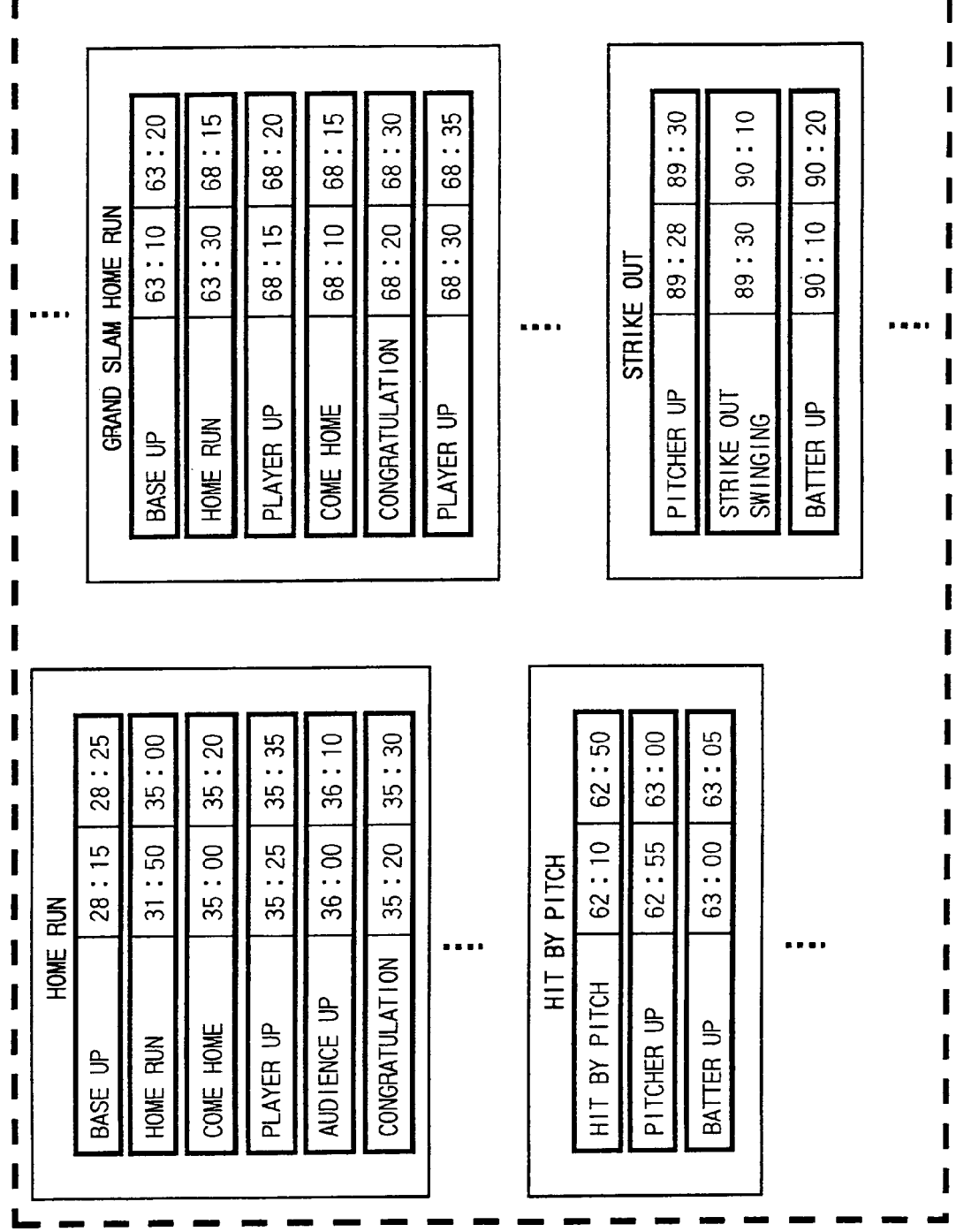
FIG. 9 shows a specific example of whole digest metadata.

FIG. 9 shows a specific example of whole digest metadata generated in the case where search in the attribute data shown in FIG. 5 is performed by setting "ABC" as a keyword, and setting an arrangement order as an "ascending order of recording time period".

Figure 10:
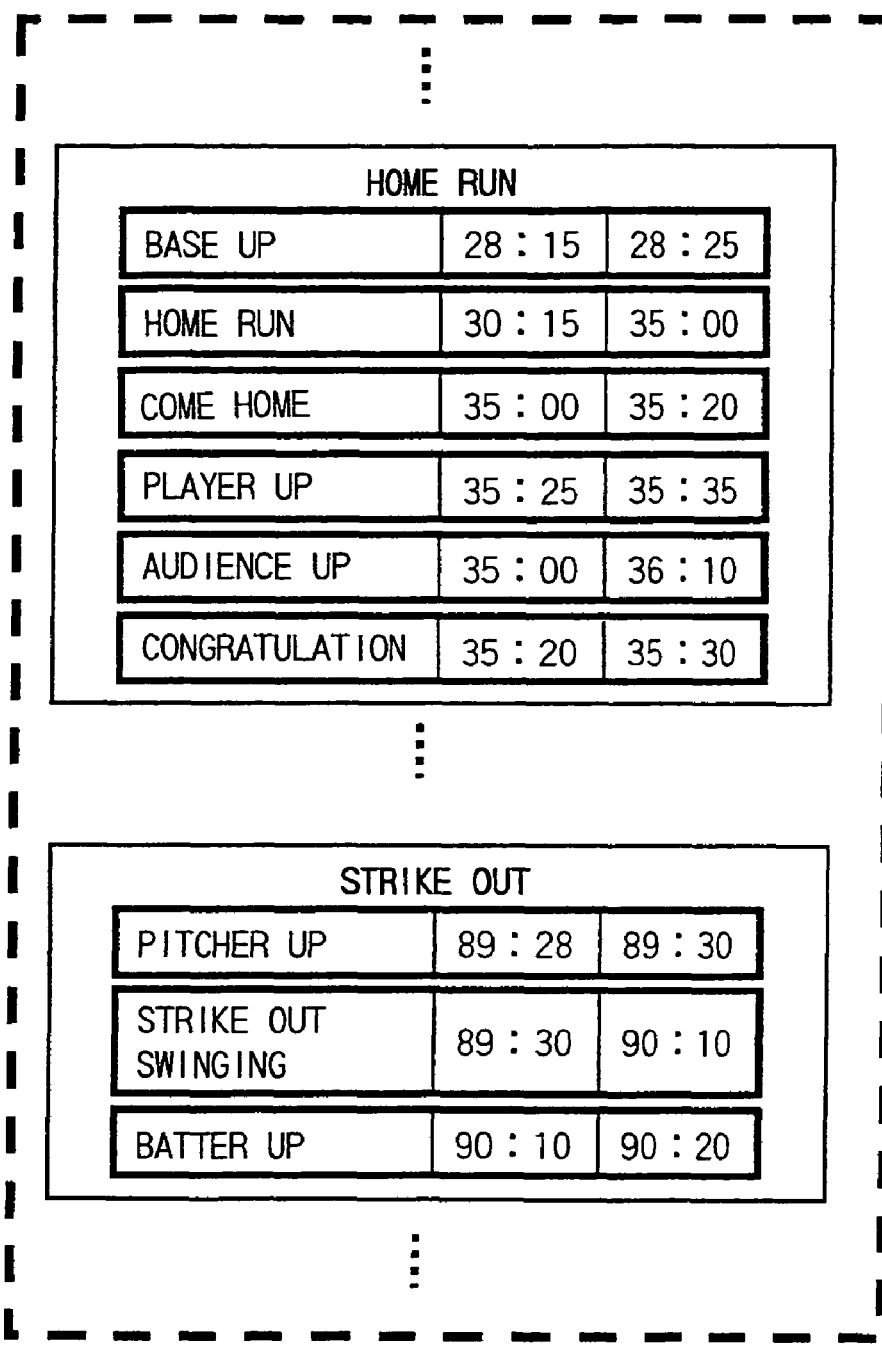
FIG. 10 shows a specific example of whole digest metadata.

FIG. 10 shows a specific example of whole digest metadata generated in the case where search in the attribute data shown in FIG. 5 is performed by setting "Yamaoka" as a keyword, and setting an arrangement order as an "ascending order of recording time period".

Also, FIG. 20 shows a specific example of whole digest metadata generated in the case where search in the attribute data shown in FIG. 5 is performed by setting five as a threshold value (search for partial digest metadata whose importance value is no less than five), and setting an arrangement order as an "ascending order of recording time period".

(Partial Digest Generation Unit 102)

Figure 11:
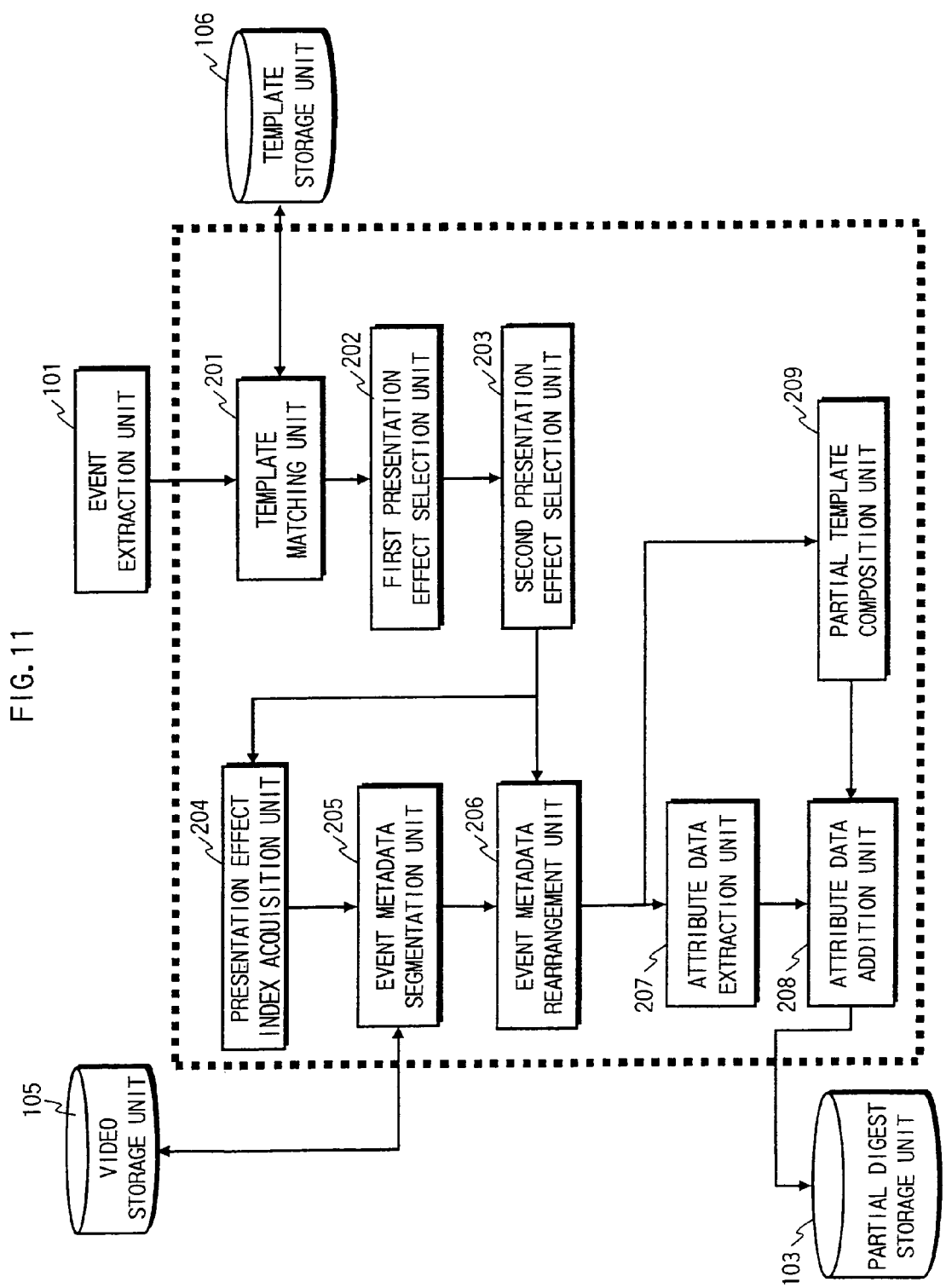
FIG. 11 is a functional block diagram showing a structure of a partial digest generation unit 102.

FIG. 11 is a functional block diagram showing a structure of the partial digest generation unit 102.

The partial digest generation unit 102 includes a template matching unit 201, a first presentation effect selection unit 202, a second presentation effect selection unit 203, a presentation effect index acquisition unit 204, an event metadata segmentation unit 205, an event metadata rearrangement unit 206, an attribute data extraction unit 207, an attribute data addition unit 208, a partial template composition unit 209.

(Template Matching Unit 201)

Upon receiving an input of a piece of main metadata and a piece of situation information in correspondence with a main index of the piece of main metadata from the event extraction unit 101, the template matching unit 201 specifies a storage location of a template corresponding to the main index shown by the input piece of main metadata. And, the template matching unit 201 acquires a presentation effect matching table from the template storage unit 106, and outputs, to the first presentation effect selection unit 202, the input piece of main metadata, the input piece of situation information, the acquired template, and the acquired presentation effect matching table.

(First Presentation Effect Selection Unit 202)

The first presentation effect selection unit 202 performs the presentation effect index first selection processing as described below.

Upon receiving an input of the piece of main metadata, the piece of situation information, the template, and the presentation effect matching table from the template matching unit 201, the first presentation effect selection unit 202 performs the following judgment processing, with reference to the situation information judgment identifier of the presentation effect matching table, for each piece of situation information and each set of a piece of main metadata and a template relating to the piece of situation information, with respect to each presentation effect index included in the presentation effect matching table: in the template, whether to set the presentation effect index as a presentation effect index to be selected (hereinafter a "selection determined index"); whether to set the presentation effect index as a presentation effect index to be a selection candidate (hereinafter a "selection candidate index"); whether to set the presentation effect index as a presentation effect index to be deleted (hereinafter a "deletion index"); and whether to set the presentation effect index as a presentation effect index to be a deletion candidate (hereinafter a "deletion candidate index"). The first presentation effect selection unit 202 notifies the second presentation effect selection unit 203 of a judgment result of each set, and outputs a piece of main metadata and a template included in each set, and a presentation effect matching table to the second presentation effect selection unit 203.

(Second Presentation Effect Selection Unit 203)

The second presentation effect selection unit 203 performs the presentation effect index second selection processing described below.

Upon receiving, from the first presentation effect selection unit 202, input of the set of the piece of main data and the template, input of the presentation effect matching table, and notification of the judgment result with respect to each set in the presentation effect index second selection processing, the second presentation effect selection unit 203 refers to an importance value shown by the piece of main metadata and an importance value judgment identifier of the presentation effect matching table to perform the following judgment, with respect to each presentation effect index included in the presentation effect matching table: whether to set the presentation effect index as a selection determined index; whether to set the presentation effect index as a selection candidate index; or whether to set the presentation effect index as a deletion candidate index; whether to set the presentation effect index as a deletion index. The second presentation effect selection unit 203 specifies, in the presentation effect index second selection processing, a selection determined index, a selection candidate index, a deletion candidate index, and a deletion decision index, and performs the following processing (selection determination processing and deletion processing) Then, the second presentation effect selection unit 203 outputs a template on which the above processing is performed (hereinafter "current template") and a piece of main data to the presentation effect index acquisition unit 204 and the event metadata rearrangement unit 206. Also, the second presentation effect selection unit 203 outputs a piece of main metadata relating to each current template, to the event metadata rearrangement unit 206.

1. Selection Determination Processing

The second presentation effect selection unit 203 determines, as a presentation effect index to be included in a template, the presentation effect index judged as the selection determined index in the judgment processing of the presentation effect index second selection processing, and the presentation effect index judged as the selection determined index in the judgment processing of the presentation effect index first selection processing.

Moreover, if the presentation effect index judged as the selection candidate index in the judgment processing of the presentation effect index second selection processing is judged as the selection candidate index in the judgment processing of the presentation effect index first selection processing, the second presentation effect selection unit 203 determines the presentation effect index as a presentation effect index to be included in the template.

2. Deletion Processing

The second presentation effect selection unit 203 deletes, from the template, the presentation effect index judged as the deletion index in the judgment processing of the presentation effect index second selection processing, and the presentation effect index judged as the deletion index in the judgment processing of the presentation effect index first selection processing.

Moreover, if the presentation effect index judged as the selection candidate index in the judgment processing of the presentation effect index second selection processing is not judged as a selection candidate index in the judgment processing of the presentation effect index first selection processing, the second presentation effect selection unit 203 deletes the presentation effect index from the template.

Also, if the presentation effect index judged as the selection candidate index in the judgment processing of the presentation effect index second selection processing is not judged as a selection candidate index in the judgment processing of the presentation effect index first selection processing, the second presentation effect selection unit 203 deletes the presentation effect index from the template. Furthermore, if the presentation effect index judged as the deletion candidate index in the judgment processing of the presentation effect index second selection processing is not judged as a selection determined index in the judgment processing of the presentation effect index second selection processing, the second presentation effect selection unit 203 deletes the presentation effect index from the template. In the same way, if the presentation effect index judged as the deletion candidate index in the judgment processing of the presentation effect index second selection processing is not judged as a selection determined index, the second presentation effect selection unit 203 deletes the presentation effect index from the template.

The following further describes the presentation effect index first and second processing, using a specific example of the template "hit".

In FIG. 21, numerical references 2001 and 2002 represent specific examples of a matching table and a template for hit respectively, which are stored in a template storage unit 106.

Suppose the following. The event extraction unit 101 inputs a piece of main metadata relating to the index "hit" represented by numerical reference 1710 in FIG. 2B and a piece of situation information relating to the piece of main metadata shown by numerical reference 1713 in FIG. 2C, to the template matching unit 201. With reference to the matching template represented by the numerical reference 2001 in FIG. 21, the template matching unit 201 acquires a template for hit with respect to each piece of main metadata, and inputs the piece of main metadata, a piece of situation information relating to the piece of main metadata, and the template for hit to the first presentation effect selection unit 202. The following describes the first and second selection processing based on the above supposition.

With respect to each presentation effect index included in the presentation effect matching table shown in FIG. 4, the first presentation effect selection unit 202 specifies a situation information judgment identifiers respectively corresponding to each piece of situation information "runner on base" and "contributing to score" represented by the numerical reference 1713 relating to the template of the index "hit" represented by the numerical reference 1710. The first presentation effect selection unit 202 judges, as a selection determined index, a presentation effect index "base up" whose piece of scene attribute information represented numerical reference 801 is "background" and a presentation effect index "come home" whose piece of scene attribute information represented numerical reference 801 is "result", each which has the specified situation information judgment identifier "⊚". The first presentation effect selection unit 202 judges, as a selection candidate index, each presentation effect index "director up (defensive team)", "director up (offensive team)", "bench players (event defensive team)", "congratulation by bench players (event offensive team)", "stand (event offensive team)", "another angle replay", and "slow replay", each which has the specified situation information judgment identifier "○". Also, the first presentation effect selection unit 202 judges other presentation effect indexes as a deletion candidate index because the specified situation information judgment identifier each shows "–". Then, the first presentation effect selection unit 202 notifies the second presentation effect selection unit 203 of these judgment results.

Next, the second presentation effect selection unit 203 performs the presentation effect index second selection processing, based on the notified judgment results.

With respect to each presentation effect index included in the presentation effect matching table shown in FIG. 4, the second presentation effect selection unit 203 specifies an importance value judgment identifier corresponding to an importance value "8" shown by the main metadata relating to the template of the index "hit" (See FIG. 2B). The second presentation effect selection unit 203 judges, as a selection determined index, each presentation effect index "player up (event defensive player)" and "player up (event offensive player)" whose piece of scene attribute information represented the numerical reference 801 is "background", each which has the specified importance value judgment identifier "⊚", and each presentation effect index "player up (event defensive player)" and "a player rise (event offensive player)" whose piece of scene attribute information represented by the numerical reference 801 is "result", each which has the specified importance value judgment identifier "⊚".

Furthermore, the second presentation effect selection unit 203 judges, as a selection candidate index, each presentation effect index "director up (event defensive team)", "director up (event offensive team)", "bench players (event defensive team)" and "congratulation by bench players (event offensive team)" whose piece of scene attribute information represented by the numerical reference 801 is "result", each which has the specified importance value judgment identifier "○".

Furthermore, the second presentation effect selection unit 203 judges, as a deletion index, the presentation effect index "base up" whose scene attribute information represented the numerical reference 801 is "background", which has the specified importance value judgment identifier "×", and each presentation effect index "another angle replay" and "slow replay" each whose scene attribute information represented the numerical reference 801 is "result", each which has the specified importance value judgment identifier "×".

Furthermore, the second presentation effect selection unit 203 judges, as a deletion determined index, a presentation effect index "audience up" whose piece of attribute information represented by the numerical reference 801 is "background" and a presentation effect index "come home" whose piece of attribute information represented by the numerical reference 801 is "result", each which has the specified importance value judgment identifier "–".

The presentation effect selection unit 203 judges, as a presentation effect index to be included in a template, each presentation effect index judged as the selection determined index "player up (event defensive player)" and "player up (event offensive player)" whose piece of scene attribute information is "background", and each presentation effect index judged as the selection determined index "player up (event defensive player)" and "player up (event offensive player)" whose piece of scene attribute information is "result".

Furthermore, the second presentation effect selection unit 203 judges, as a presentation effect index to be included in the template, each presentation effect index judged as the selection candidate index "director up (event defensive team)", "director up (event offensive team)", "bench players (event defensive team)", "congratulation by bench players (event offensive team)", and "stand (event offensive team)" whose piece of scene attribute information represented by the numerical reference 801 is "result", because these presentation effect indexes are judged as the selection candidate index in the presentation effect index first selection processing.

On the other hand, the second presentation effect selection unit 203 deletes each presentation effect index judged as the selection candidate index in the judgment processing of the presentation effect index first selection processing "another angle replay" and "slow replay" whose piece of scene attribute information represented by the numerical reference 801 is "result", because these presentation effect indexes are judged as the deletion index in the presentation effect index second selection processing.

Also, the second presentation effect selection unit 203 judges, as a presentation effect index to be included in the template, each presentation effect index judged as the deletion candidate index "base up" whose scene attribute information represented by the numerical reference 801 is "background", and "come home" whose scene attribute information represented by the numerical reference 801 is "result", because these presentation effect indexes are judged as the selection candidate index in the judgment processing of the presentation effect index first selection processing.

Also, the second presentation effect selection unit 203 deletes the presentation effect index "audience up" whose scene attribute information represented by the numerical reference 801 is "background", because the presentation effect index is judged as the deletion candidate index in the judgment processing of the presentation effect index first selection processing.

The presentation effect indexes on which the selection processing is performed are rearranged by the event metadata rearrangement unit 206, in accordance with a reproduction order shown by a current template, and then are incorporated to partial digest metadata by the partial template composition unit 205.

FIG. 22 shows a specific example of partial digest metadata generated with respect to main metadata "hit" shown by the numerical reference 1710 in FIG. 2B.

FIG. 23 and FIG. 24 show specific examples of partial digest metadata with respect to each piece of main metadata of "hit" shown by the numerical references 1711 and 1712. The piece of main metadata is generated as a result of the presentation effect index first and second selection processing in the same way, when each piece of main metadata relating to "hit" shown by numerical references 1711 and 1712 in FIG. 2B and each piece of situation information shown by numerical references 1714 and 1715 in FIG. 2C relating to the piece of main metadata are input to the template matching unit 201.

(Presentation Effect Index Acquisition Unit 204)

The presentation effect index acquisition unit 204 extracts a presentation effect index from each current template input by the second presentation effect selection unit 203, and outputs the extracted presentation effect index and each piece of main metadata input by the second presentation effect selection unit 203, to the event metadata segmentation unit 205.

(Event Metadata Segmentation Unit 205)

Based on the presentation effect index with respect to the current template input by the presentation effect index acquisition unit 204 and an IN point and an OUT point shown by the piece of main metadata relating to the current template, the event metadata segmentation unit 205 extracts, from the piece of event metadata including the presentation effect index stored in the video storage unit 105, a piece of event metadata whose IN point and OUT point are in a closer recording time period to a recording time period specified by the IN point and the OUT point shown by the piece of main metadata (hereinafter "presentation effect event metadata"). Then, the event metadata segmentation unit 205 outputs the extracted piece of presentation effect event metadata to the event metadata rearrangement unit 206.

Here, the "closer recording time period" is preset, and indicates a recording time period that is included in a time period specified by the IN point and the OUT point shown by the piece of main metadata, or a recording time period that is within the specified time period being a predetermined time period (for example, for several seconds to several tens of seconds). Therefore, a piece of presentation effect event metadata relating to the piece of main metadata can be extracted among a plurality of pieces of event metadata having a same index.

(Event Metadata Rearrangement Unit 206)

The event metadata rearrangement unit 206 rearranges each piece of main metadata relating to the current template input by the second presentation effect selection unit 203 and each piece of presentation effect event metadata relating to the current template input by the event metadata segmentation unit 205, in accordance with a reproduction order shown by the current template. Then, the event metadata rearrangement unit 206 outputs the rearranged pieces of main metadata and presentation effect event metadata to the attribute data extraction unit 207 and the partial template composition unit 209.

(Attribute Data Extraction Unit 207)

Upon receiving an input of the rearranged pieces of main metadata and presentation effect event metadata relating to the current template from the event metadata rearrangement unit 206, the attribute data extraction unit 207 acquires, from the main metadata, a main index, a recording time period determined based on an IN point and an OUT point of the piece of main metadata. The attribute data extraction unit 207 further acquires a keyword from each piece of presentation effect event metadata.

Moreover, the attribute data extraction unit 207 calculates an importance value for each current template based on the importance value shown by the piece of main metadata and each piece of presentation effect event metadata. The importance value may be acquired by simply adding each importance value, calculating an average of each importance value, or weighting the importance value of the piece of main metadata (for example, by adding an average of importance value of each piece of presentation effect event metadata and an importance value of the piece of main metadata).

Moreover, the attribute data extraction unit 207 acquires a reproduction order from each current template, generates a piece of attribute data based on the acquired or calculated various pieces of data, and outputs the generated piece of attribute data to the attribute data addition unit 208.

(Partial Template Composition Unit 209)

The partial template composition unit 209 extracts a main index, a presentation effect index, an IN point, and an OUT point, from the rearranged pieces of main metadata and presentation effect event metadata relating to each current template input by the event metadata rearrangement unit 206, arranges each extracted index in the order after rearrangement, generates a piece of partial digest metadata by adding an IN point and an OUT point corresponding to each index, and outputs the generated piece of partial digest metadata to the attribute data addition unit 208.

(Attribute Data Addition Unit 208)

The attribute data addition unit 208 stores the piece of partial digest metadata input by the partial template composition unit 209 in the partial digest storage unit 103 in correspondence with the piece of attribute data input by the attribute data extraction unit 207.

Specifically, the attribute data addition unit 208 adds the partial path that shows a storage location where the piece of partial digest metadata is stored in the partial digest storage unit 103 to the piece of attribute data, and stores the piece of attribute data in the partial digest storage unit 103.

<Operations>

(Presentation Effect Index First Selection Processing)

Figure 12:
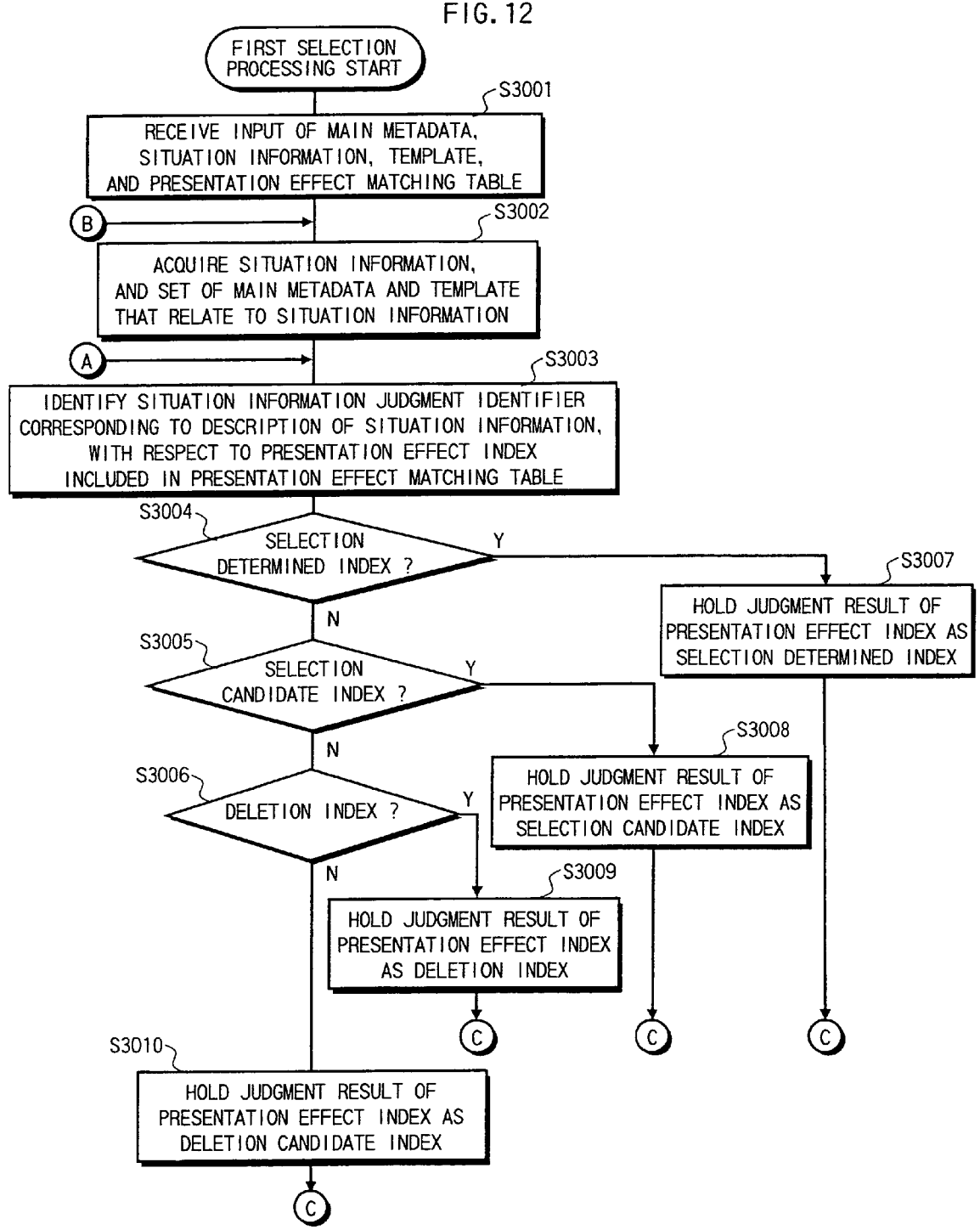
FIG. 12 is a part of a flow chart showing operations of presentation effect index first selection processing performed by a first presentation effect selection unit 202.
Figure 13:
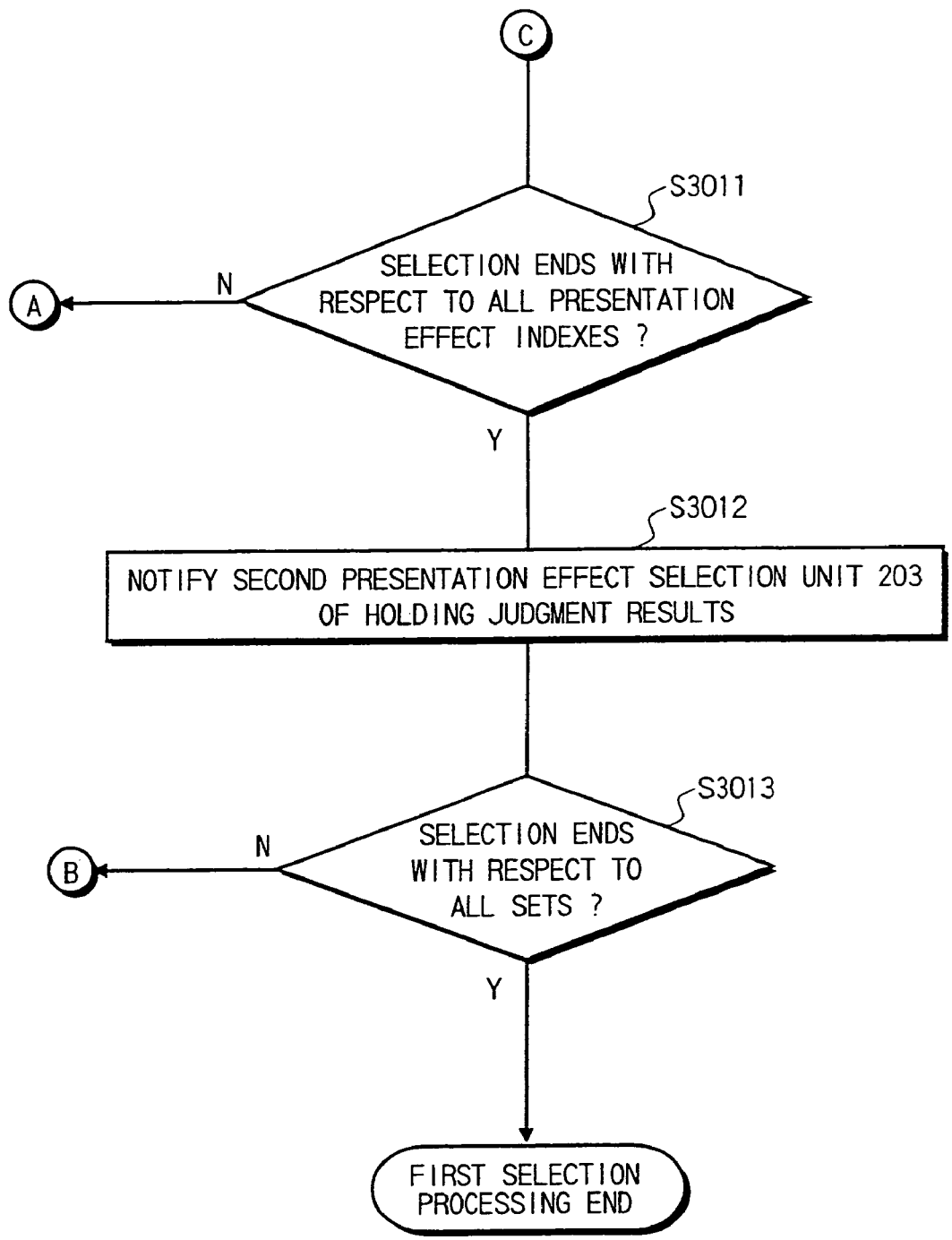
FIG. 13 is a part of the flow chart showing the operations of the presentation effect index first selection processing performed by the first presentation effect selection unit 202.

The following describes operations of the presentation effect index first selection processing performed by the first presentation effect selection unit 202. FIG. 12 and FIG. 13 are flow charts showing the above operations.

Upon receiving an input of each piece of main metadata, each piece of situation information, each template, and a presentation effect matching table from the template matching unit 201 (Step S3001), the first presentation effect selection unit 202 acquires each piece of the situation information and each set of main metadata and a template relating to the piece of the situation information (Step S3002), referrers to a situation information judgment identifier of the presentation effect matching table, and specifies, with respect to each presentation effect index included in the presentation effect matching table, a situation information judgment identifier corresponding to a description shown by the piece of the situation information (Step S3003). In accordance with the situation information judgment identifier, the first presentation effect selection unit 202 judges whether the presentation effect index is a selection determined index or not (Step S3004), a selection candidate index or not (Step S3005), and a deletion index or not (Step S3006).

If the presentation effect index is the selection determined index (Step S3004: Y), the first presentation effect selection unit 202 holds a judgment result of the presentation effect index as the selection determined index (Step S3007), and judges whether the selection processing has ended with respect to all the presentation effect indexes included in the presentation effect matching table (Step S3011). If the selection processing has ended (Step S3011: Y), the first presentation effect selection unit 202 notifies the second presentation effect selection unit 203 of each judgment result held therein (Step S3012), outputs the main metadata and the template included in the set to the second presentation effect selection unit 203, and further judges whether the selection processing has ended with respect to all the sets (Step S3013).

In Step 3011, if the selection processing has not ended (Step S3011: N); the processing proceeds to Step S3003. In Step 3013, if the selection processing has not ended (Step S3013: N), the processing proceeds to Step S3002.

In Step 3005, if the presentation effect index is the selection candidate index (Step S3005: Y), the first presentation effect selection unit 202 holds the judgment result of the presentation effect index as the selection candidate index (Step S3008). Then, the processing proceeds to Step S3011.

In Step 3006, if the presentation effect index is the deletion index (Step S3006: Y), the first presentation effect selection unit 202 holds the judgment result of the presentation effect index as the deletion index (Step S3009). Then, the processing proceeds to Step S3011.

In Step 3006, if the presentation effect index is not the deletion index (Step S3006: N), the first presentation effect selection unit 202 judges the presentation effect index as the deletion candidate index, and holds the judgment result of the presentation effect index as the deletion candidate index (Step S3010). Then, the processing proceeds to Step S3011.

(Presentation Effect Index Second Selection Processing)

Figure 14:
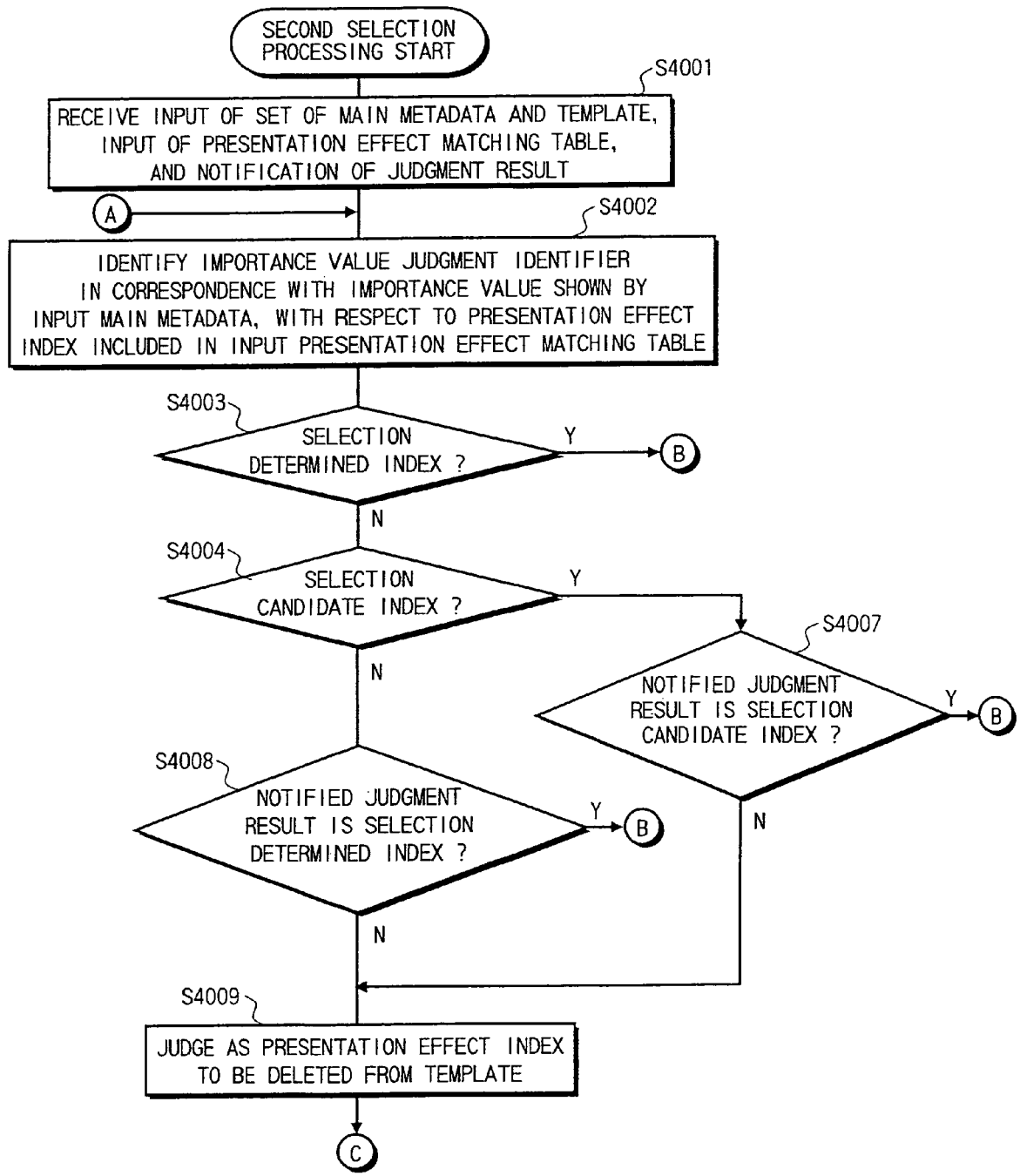
FIG. 14 is a part of a flow chart showing operations of presentation effect index second selection processing performed by a second presentation effect selection unit 203.
Figure 15:
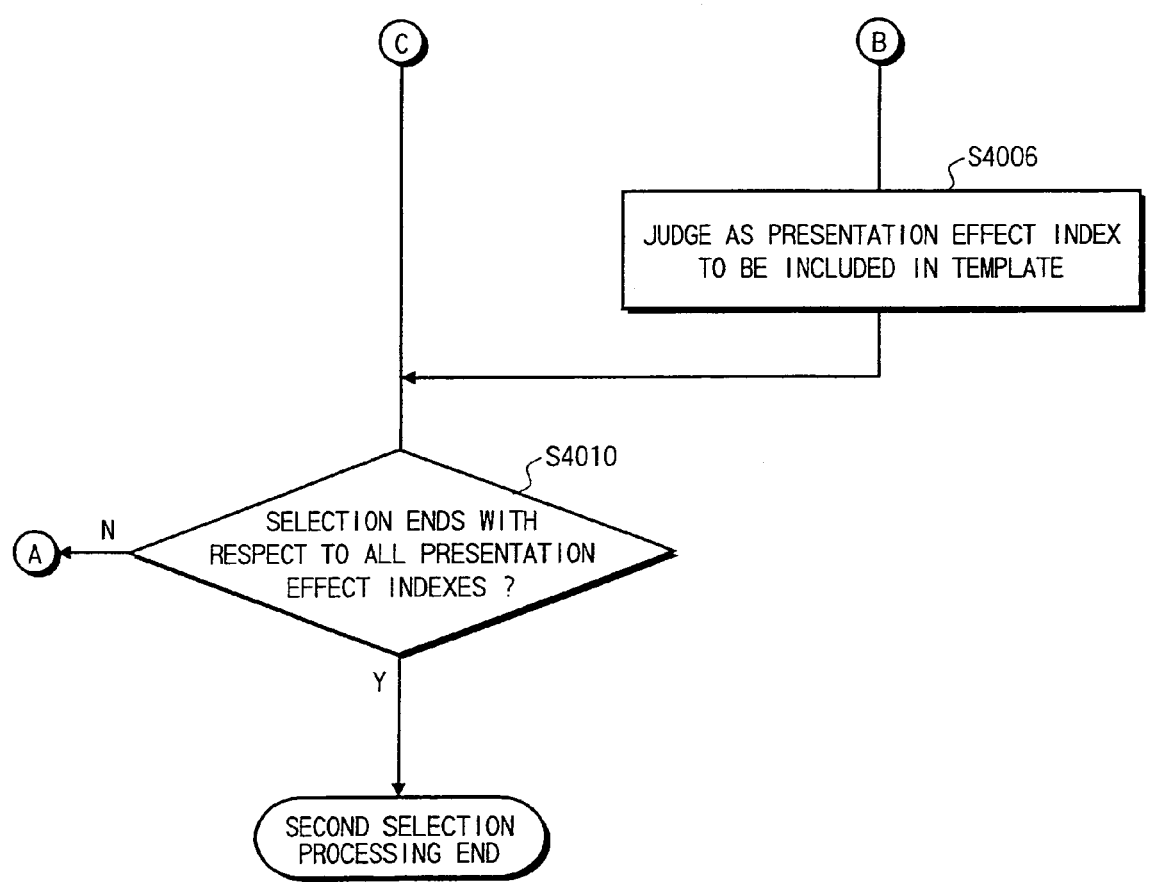
FIG. 15 is a part of the flow chart showing the operations of the presentation effect index second selection processing performed by the second presentation effect selection unit 203.

The following describes operations of the presentation effect index second selection processing performed by the second presentation effect selection unit 203. FIG. 14 and FIG. 15 are flow charts showing the operations.

Upon receiving the input of the set of the main metadata and the template, the input of the presentation effect matching table, and the notification of the judgment result from the first presentation effect selection unit 202 (Step S4001), the second presentation effect selection unit 203 specifies an importance value judgment identifier in correspondence with an importance value shown by the input main metadata, with respect to each presentation effect indexes included in the input presentation effect matching table (Step S4002). In accordance with the importance value judgment identifier, the second presentation effect selection unit 203 judges whether the presentation effect index is a selection determined index or not (Step S4003), and a selection candidate index or not (Step S4004).

In Step 4003, if the presentation effect index is the selection determined index (Step S4003: Y), the second presentation effect selection unit 203 judges the presentation effect index as a presentation effect index to be included in a template (Step S4006), and judges whether the selection processing has ended with respect to all the presentation effect indexes included in the presentation effect matching table (Step S4010). If the selection processing has not ended (Step S4010: N), the processing proceeds to Step S4002.

In Step 4004, if the presentation effect index is the selection candidate index (Step S4004: Y), the second presentation effect selection unit 203 judges, with respect to the presentation effect index, whether the judgment result notified from the first presentation effect selection unit 202 is the selection candidate index (Step S4007). If the presentation effect index is the selection candidate index (Step S4007: Y), the processing proceeds to Step S4006. If the presentation effect index is not the selection candidate index (Step S4007: N), the second presentation effect selection unit 203 judges the presentation effect index as a presentation effect index to be deleted from the template (Step S4009). Then, the processing proceeds to Step S4010.

In Step 4004, if the presentation effect index is not the selection candidate index (Step S4004: N), the second presentation effect selection unit 203 judges the presentation effect index as the deletion index or the deletion candidate index. Then the second presentation effect selection unit 203 judges, with respect to the presentation effect index, whether the judgment result notified from the first presentation effect selection unit 202 is the selection determined index (Step S4008). If the judgment result is the selection determined index (Step S4008: Y), the processing proceeds to Step S4006. If the judgment result is not the selection determined index (Step S4008: N), the processing proceeds to Step S4009.

The second presentation effect selection unit 203 repeats the above-described selection processing whenever receiving, from the first presentation effect selection unit 202, an input of a set of main metadata and a template, an input of a presentation effect matching table, and notification of a judgment result. And, the second presentation effect selection unit 203 outputs each current template on which the presentation effect index second selection processing is performed, to the presentation effect index acquisition unit 204 and the event metadata rearrangement unit 206. Furthermore, the second presentation effect selection unit 203 outputs main metadata relating to each current template to the event metadata rearrangement unit 206.

(Partial Digest Metadata Generation Processing)

Figure 16:
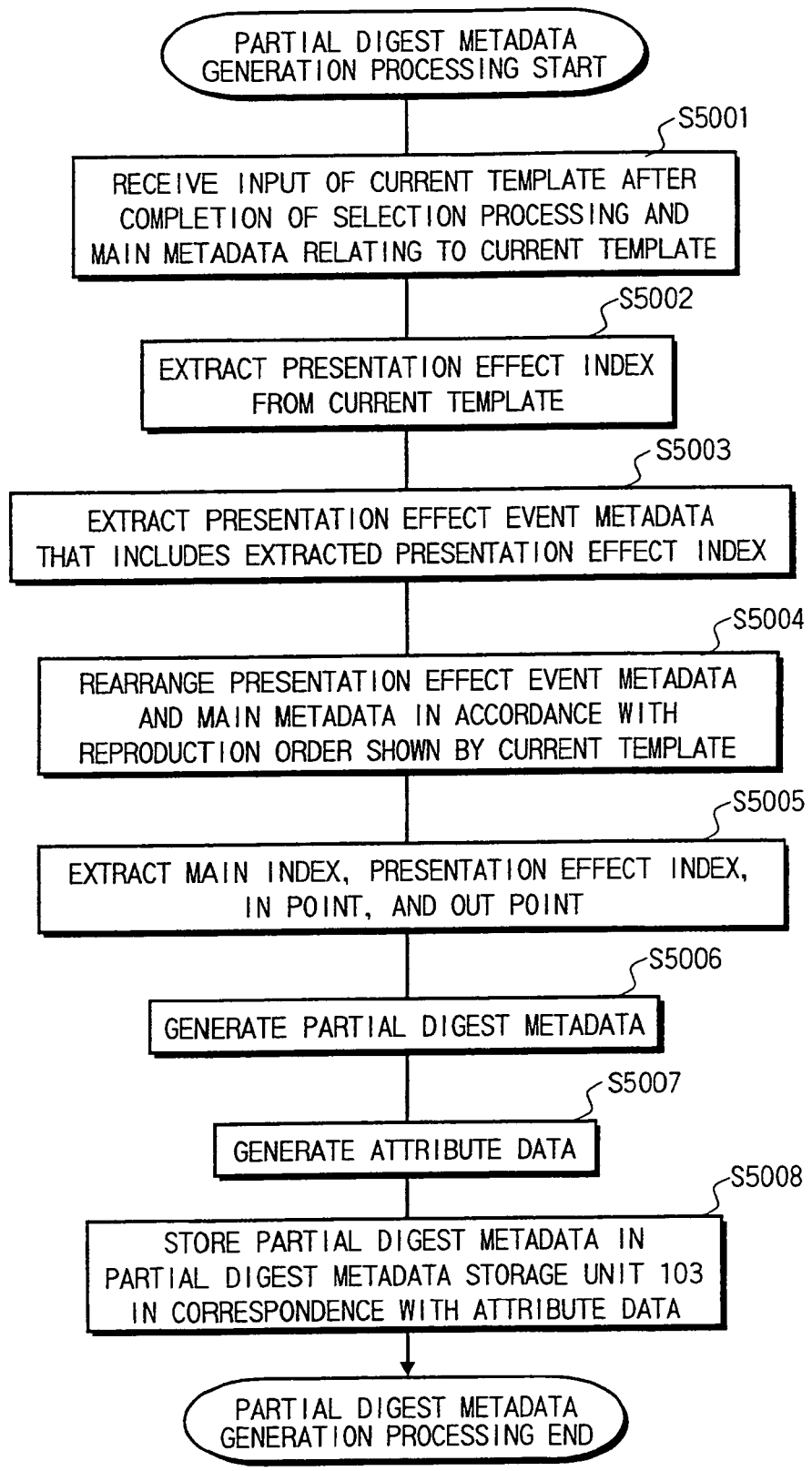
FIG. 16 is a flow chart showing operations of partial digest metadata generation processing performed by the partial digest generation unit 102.

The following describes operations of the partial digest metadata generation processing performed by the partial digest generation unit 102. FIG. 16 is a flow chart showing the operations.

Upon receiving the input of the current template on which the presentation effect index second selection processing is performed and the main metadata relating to the current template (Step S5001), the partial digest generation unit 102 extracts a presentation effect index from the current template (Step S5002), and extracts pieces of presentation effect event metadata that each includes the presentation effect index extracted from the video storage unit 105 (Step S5003). And, the partial digest generation unit 102 rearranges the pieces of the presentation effect event metadata extracted with respect to the current template and main metadata relating to the current template, in accordance with a reproduction order shown by the current template (Step S5004). From the main metadata and the pieces of the presentation effect event metadata that are rearranged, the partial digest generation unit 102 extracts a main index, a presentation effect index, an IN point, and an OUT point, (Step S5005), arranges the indexes in the order after the rearrangement, and adds an IN point and an OUT point corresponding to each index to generate partial digest metadata (Step S5006). Furthermore, from the main metadata and the pieces of the presentation effect event metadata that are rearranged, the partial digest generation unit 102 acquires a main index, a recording time calculated based on the IN point and the OUT point shown by the main metadata, and a keyword. Then, the partial digest generation unit 102 calculates an importance value with respect to the current template, acquires a reproduction order from the current template, generates attribute data based on these (Step S5007), and stores the generated partial digest metadata in the partial digest storage unit 103 in correspondence with the generated attribute data (Step S5008).

(Whole Digest Metadata Generation Processing)

The following describes operations of the whole digest metadata generation processing performed by the whole digest generation unit 104.

Figure 17:
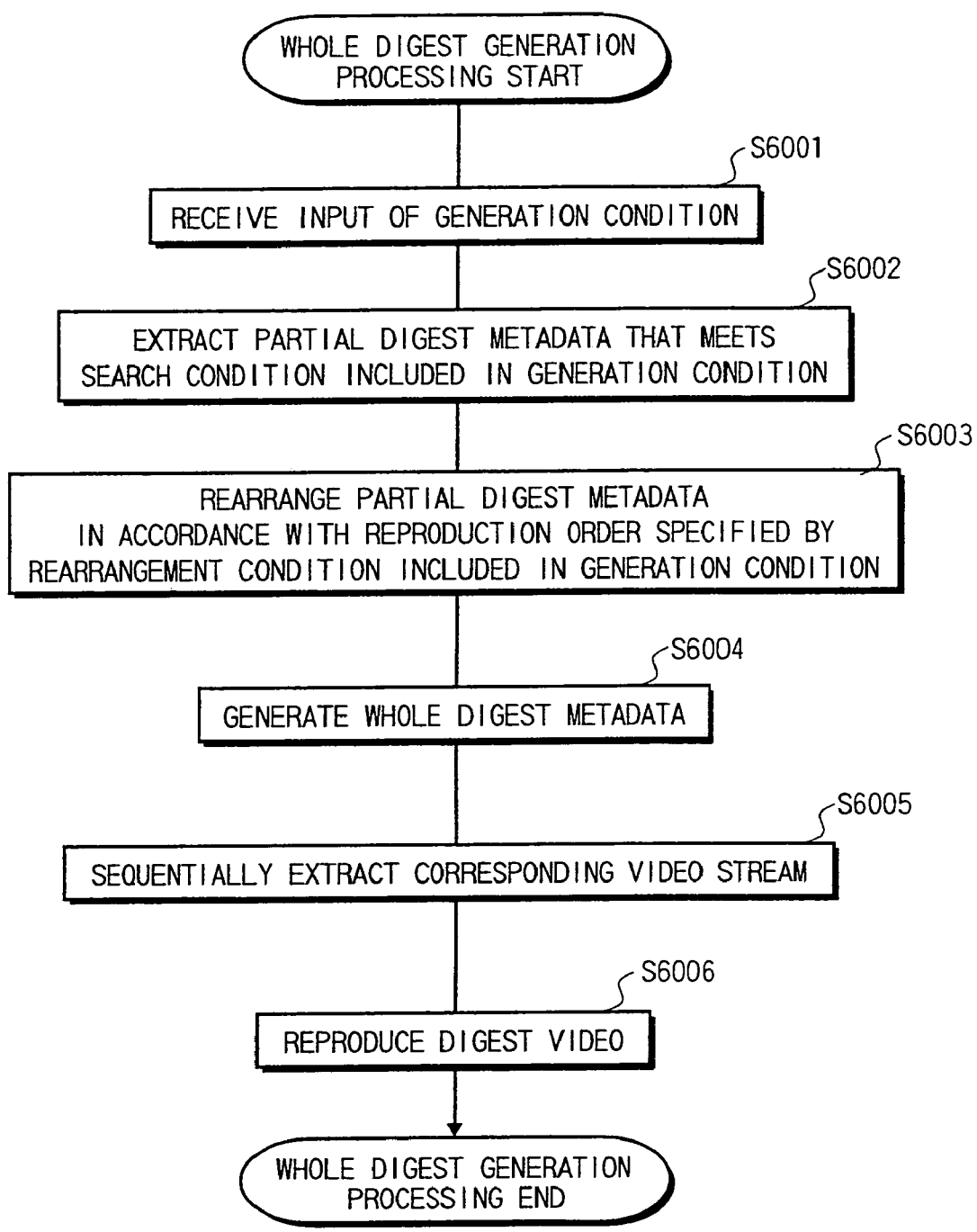
FIG. 17 is a flow chart showing operations of whole digest metadata generation processing performed by the whole digest generation unit 104.

FIG. 17 is a flow chart showing the operations.

Upon receiving an input of a generation condition from the digest generation condition input unit 107 (Step S6001), the whole digest generation unit 104 extracts pieces of partial digest metadata that meet a search condition included in the generation condition, from the attribute data stored in the partial digest storage unit 103 (Step S6002), and rearranges the extracted pieces of the partial digest metadata in accordance with a reproduction order specified by a rearrangement condition included in the generation condition (Step S6003). Based on each the rearranged pieces of the partial digest metadata, the whole digest generation unit 104 combines the rearranged pieces of the partial digest metadata in accordance with the order after the rearrangement to generate whole digest metadata (Step S6004). Furthermore, in accordance with the order after the rearrangement, based on the IN point and the OUT point (and a camera number if included) with respect to an index included in the partial digest metadata, the whole digest generation unit 104 sequentially extracts a corresponding video stream from the video storage unit 105 (Step S6005), and reproduces a digest video by reproducing the extracted video stream (Step S6006).

<Supplement>

Although the video editing device 10 according to the present invention has been described based on the above embodiment, the present invention is not of course limited to the embodiment.

(1) In the embodiment, the contents of the index of the template relating to the main metadata are changed in accordance with the situation information and the importance value in correspondence with the main metadata. However, contents of the template relating to the main metadata may be fixed.

Specifically, the following may be employed. In the structure of the partial digest generation unit 102 shown in FIG. 11, the partial digest generation unit 102 has a structure not including the first presentation effect selection unit 202 and the second presentation effect selection unit 203. A template acquired by the template matching unit 201 in correspondence with each piece of the main metadata is output to the presentation effect index acquisition unit 204. Subsequently, with respect to each output template, the same processing as that in the embodiment is performed in each of the presentation effect index acquisition unit 204, the event metadata segmentation unit 205, the event metadata rearrangement unit 206, the attribute data extraction unit 207, the attribute data addition unit 208, and the partial template composition unit 209, in order to generate partial digest metadata and attribute data with respect to each piece of main metadata, and store each generated digest metadata and attribute data in the partial digest storage unit 103.

Figure 19:
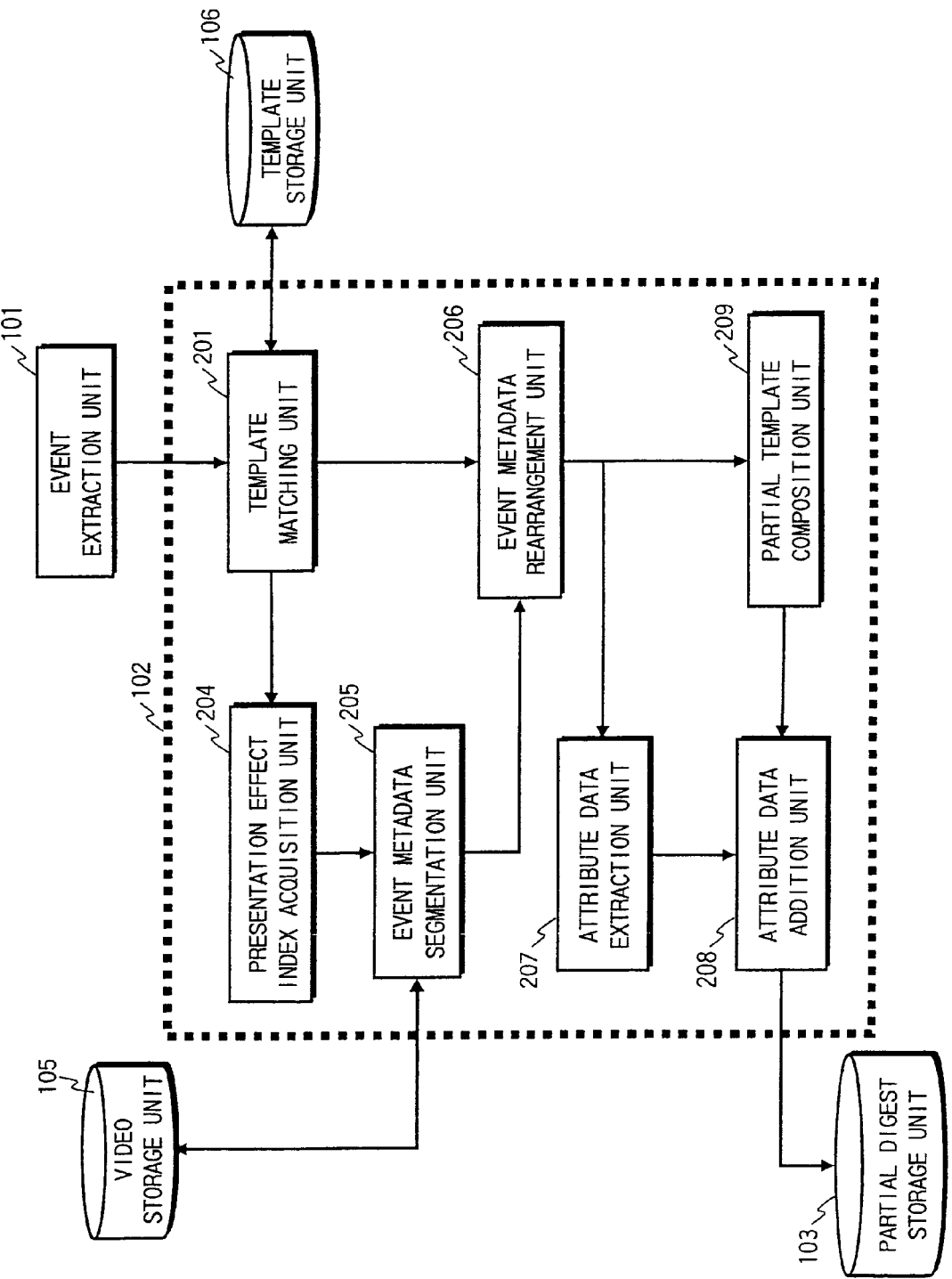
FIG. 19 is a functional block diagram showing a structure of a partial digest generation unit 102 in a modification.

FIG. 19 is a functional block diagram showing a structure of the partial digest generation unit 102 in the above modification.

(2) In the embodiment, the single presentation effect matching table is provided irrespective of template type to each which main index belongs. However, a presentation effect matching table different for each template type to which the main index belongs may be provided. Also, a presentation effect matching table may be provided for each of a specific plurality of types of templates to which the main index belongs.

(3) In the embodiment, a presentation effect index is selected from a presentation effect matching table, based on situation information and an importance value shown by main metadata. However, the following may be employed. A field for judgment identifiers based on a user's preference is provided in a presentation effect matching table to allow the user to perform input setting of a judgment identifier. A presentation effect index is selected based on a user's preference-based judgment identifier in addition to the situation information and the importance value. For example, in the presentation effect matching table shown in FIG. 4, suppose that a judgment identifier of each presentation effect index "player up" is set as "⊚". The presentation effect index "player up" can be included in partial digest metadata after selection, and therefore a scene in which a player is closed-up can be included in a digest video to be reproduced.

(4) In the embodiment, a video stream, event metadata, and situation information are stored in the video storage unit 105 separately from these, a matching table, a template, and a presentation effect matching table are stored in the template storage unit 106. However, all of these may be stored in a single storage unit or storage medium.

(5) The video editing system 10 in the embodiment has the structure in which the video editing device 100 includes the partial digest generation unit 102, the partial digest storage unit 103, and the whole digest generation unit 104. However, the video editing system 10 may have the following structure. For example, a video editing device of a broadcasting station includes the video storage unit 105, the event extraction unit 101, the partial digest generation unit 102, and the partial digest storage unit 103. A broadcasting receiver of the user that receives broadcasts includes the whole digest generation unit 104, the digest generation condition input unit 107, and the video storage unit 205 that stores only video streams received from the broadcasting station. The video editing device of the broadcasting station is connected with the broadcasting receiver of the user via an electric telecommunication line (for example, the Internet).

Specifically, the following may be employed. The digest generation condition input unit 107 inputs a generation condition of a digest video, and therefore the whole digest generation unit 104 connects to the video editing device of the broadcasting station via the electric telecommunication line, and acquires partial digest metadata that meets the generation condition from the partial digest storage unit 103. Based on the acquired partial digest metadata, the whole digest generation unit 104 extracts a corresponding partial video stream from the video storage unit 205 included in the broadcasting receiver to generate a digest video.

This enables easy at-home reproduction of a digest video of received broadcast programs.

(6) The video stream used in the embodiment may be a video stream of a real-time live broadcasting or a prerecorded video stream for video reproduction.

Also, the contents of the video stream are not limited to the baseball games, and other sports games or karaoke contests may be employed.

For example, in the case where a digest video of videos of scenes in which contestants are singing in a karaoke contest is generated, with respect to a contestant who earns a high score, video that includes a supplement scene, such as a profile of the contestant in addition to a scene the contestant is singing is extracted, as a digest video. With respect to a contestant who earns a low score, only a video of a scene in which the contestant is singing is extracted. In this way, with respect to video streams other than the streams of the baseball games, a digest video that attracts viewers' interests can be generated using the present invention.

(7) The video editing system 10 in the embodiment is specifically a computer system composed of a microprocessor, a ROM, a RAM, a hard disk unit, a display unit, a keyboard, a mouse, etc. A computer program is stored in the RAM or the hard disk unit. Functions of each unit of the video editing device 100 are achieved by the microprocessor operating in accordance with the computer program. Here, the computer program is composed of a plurality of command codes that show instructions to the computer, in order to achieve predetermined functions.

(8) Formats of partial digest metadata and whole digest metadata that are generated in the video editing device 100 in the embodiment may be XML (Extensible Markup Language), RDF (Resource Description Framework), or EDL (Edit Decision List).

Also, other formats may be employed.

(9) Moreover, in the embodiment, situation information is data different from main metadata. However, the situation information may be included in the main metadata.

INDUSTRIAL APPLICABILITY

The present invention can be used as an art for generating digest video by extracting specific portions from a video stream of recorded video.

The invention claimed is:

1. A video editing device that extracts a specific scene among a plurality of scenes included in a video stream stored in a storage medium, and reproduces the extracted specific scene,
   wherein the plurality of scenes includes:
      a first scene as a main scene; and
      a plurality of types of second scenes, each second scene of the second scenes being for increasing a presentation effect of the first scene and being a selection candidate of a scene to be reproduced in combination with the first scene,
   wherein the storage medium stores:
      first scene specification information specifying the first scene, including time information indicating a storage position of the first scene as a storage time, and including pieces of situation information, each piece of situation information, of the pieces of situation information, indicating a situation of a scene relating to the first scene;
      a plurality of pieces of second scene specification information, each respective piece of second scene specific information, of the plurality of pieces of second scene specification information, specifying a respective second scene of the second scenes, including time information indicating a storage position of the respective second scene as a storage time, and including a piece of identification information of pieces of identification information, such that each piece of identification information, of the pieces of identification information, identifies one of the plurality of types of the second scenes; and
      a selection table indicating a correspondence between the pieces of situation information and the pieces of identification information, and
   wherein the video editing device comprises:
      an acquisition unit operable to acquire the first scene specification information;
      a selection unit operable to select, from the selection table, one or more pieces of the identification information in correspondence with a piece of situation information, of the pieces of situation information, included in the acquired first scene specification information; and
      an extraction unit operable to extract, as one or more pieces of information each specifying a second scene, of the second scenes, to be reproduced in combination with the first scene specified by the acquired first scene specific information, one or more pieces of second scene specification information, of the plurality of pieces of second scene specification information, specifying a second scene, of the second scenes, that (i) matches a type identified by the selected one or more pieces of identification information and (ii) has a storage time closest to the storage time of the first scene.

2. The video editing device of claim 1,
   wherein the storage medium stores template information indicating a reproduction order of the first scene and the plurality of types of second scenes, in correspondence with the first scene specification information, and
   wherein the video editing device further comprises a reproduction unit operable to, based on the first scene specification information and the extracted one or more pieces of second scene specification information, extract, from the video stream, the first scene and one or more of the second scenes specified by the extracted one or more pieces of second scene specification information, and reproduce the extracted first scene and the extracted one or more second scenes in accordance with the reproduction order.

3. The video editing device of claim 2,
wherein the video stream includes a plurality of first scenes,
wherein the storage medium stores:
   a plurality of pieces of first scene specification information; and
   a plurality of pieces of template information respectively corresponding to the plurality of pieces of first scene specification information,
wherein, each time the acquisition unit acquires a piece of first scene specification information, of the plurality of pieces of first scene specification information, (i) the selection unit selects, from the selection table, one or more pieces of the pieces of identification information each identifying a type of a second scene, of the plurality of types of second scenes, in correspondence with a piece of situation information, of the pieces of situation information, included in the acquired piece of first scene specification information, and (ii) the extraction unit extracts one or more pieces of second scene specification information, of the plurality of pieces of second scene specification information, specifying a second scene, of the second scenes, that matches a type identified by the selected one or more pieces of identification information and indicates a storage time closest to a storage time of a first scene, of the plurality of first scenes, identified by the acquired piece of first scene specification information, and
wherein the reproduction unit includes:
   a generation subunit operable to generate partial index information that includes time information included in the acquired piece of first scene specification information, time information included in the extracted one or more pieces of second scene specification information, and template information corresponding to the acquired piece of first scene specification information;
   a storage subunit operable to store the generated partial index information; and
   a stream reproduction subunit operable to read the partial index information from the storage subunit in accordance with a user's instruction, extract the first scene identified by the acquired piece of first specification information and one or more second scenes matching the type identified by the selected one or more pieces of identification information from the video stream based on the read partial index information, and reproduce the extracted first scene and the extracted one or more second scenes.

4. The video editing device of claim 1, wherein a piece of the situation information indicates a situation of a scene immediately before the first scene.

5. The video editing device of claim 1, wherein a piece of the situation information indicates a situation of a scene that shows a result based on the first scene.

6. The video editing device of claim 2,
wherein the storage medium stores a plurality of types of video streams, each respective video stream of the video streams having added thereto a piece of stream identification information identifying one of the video streams, wherein the first scene specification information includes a piece of stream identification information identifying one of the video streams having the first scene stored therein,
wherein each piece of second scene specification information, of the plurality of pieces of second scene specification information, includes a piece of stream identification information identifying one of the video streams having one of the second scenes stored therein, and
wherein the reproduction unit extracts the identified first scene from the identified video stream having the piece of stream identification information included in the first scene specification information, and extracts the second scene from the video stream having the piece of stream identification information included in the second scene specification information.

7. A video editing device that extracts a specific scene among a plurality of scenes included in a video stream stored in a storage medium, and reproduces the extracted specific scene,
wherein the plurality of scenes includes:
   a first scene as a main scene; and
   a plurality of types of second scenes, each second scene of the second scenes being for increasing a presentation effect of the first scene and being a selection candidate of a scene to be reproduced in combination with the first scene,
wherein the storage medium stores:
   first scene specification information specifying the first scene, including time information indicating a storage position of the first scene as a storage time, and including importance degree information indicating an importance degree of the first scene;
   a plurality of pieces of second scene specification information, each respective piece of second scene specification information, of the plurality of pieces of second scene specification information, specifying a respective second scene of the second scenes, including time information indicating a storage position of the respective second scene as a storage time, and including a piece of identification information of pieces of identification information, such that each piece of identification information, of the pieces of identification information, identifies one of the plurality of types of the second scenes; and
   a selection table indicating a correspondence between pieces of the importance degree information and the pieces of identification information, and
wherein the video editing device comprises:
   an acquisition unit operable to acquire the first scene specification information;
   a selection unit operable to select, from the selection table, one or more pieces of the identification information in correspondence with a piece of the importance degree information of the pieces of importance degree information; and
   an extraction unit operable to extract, as one or more pieces of information each specifying a second scene, of the second scenes, to be reproduced in combination with the first scene specified by the acquired first scene specific information, one or more pieces of second scene specification information, of the plurality of pieces of second scene specification information, specifying a second scene, of the second scenes, that (i) matches a type identified by the selected one or more pieces of identification information and (ii) has a storage time closest to the storage time of the first scene.

8. A video editing method that extracts a specific scene among a plurality of scenes included in a video stream stored in a storage medium, and reproduces the extracted specific scene,
   wherein the plurality of scenes includes:
      a first scene as a main scene; and
      a plurality of types of second scenes, each second scene of the second scenes being for increasing a presentation effect of the first scene and being a selection candidate of a scene to be reproduced in combination with the first scene,
   wherein the storage medium stores:
      first scene specification information specifying the first scene, including time information indicating a storage position of the first scene as a storage time, and including pieces of situation information, each piece of situation information, of the pieces of situation information, indicating a situation of a scene relating to the first scene;
      a plurality of pieces of second scene specification information, each respective piece of second scene specification information, of the plurality of pieces of second scene specification information, specifying a respective second scene of the second scenes, including time information indicating a storage position of the respective second scene as a storage time, and including a piece of identification information of pieces of identification information, such that each piece of identification information, of the pieces of identification information, identifies one of the plurality of types of the second scenes; and
      a selection table indicating a correspondence between the pieces of situation information and the pieces of identification information, and
   wherein the video editing method comprises:
      acquiring the first scene specification information;
      selecting, from the selection table, one or more pieces of the identification information in correspondence with a piece of situation information, of the pieces of situation information, included in the acquired first scene specification information; and
      extracting, as one or more pieces of information each specifying a second scene, of the second scenes, to be reproduced in combination with the first scene specified by the acquired first scene specific information, one or more pieces of second scene specification information, of the plurality of pieces of second scene specification information, specifying a second scene, of the second scenes, that (i) matches a type identified by the selected one or more pieces of identification information and (ii) has a storage time closest to the storage time of the first scene.

9. A non-transitory computer-readable recording medium having a program recorded thereon, the program causing a video editing device to perform video editing processing, the video editing device extracting a specific scene among a plurality of scenes included in a video stream stored in a storage medium and reproducing the extracted specific scene,
   wherein the plurality of scenes includes:
      a first scene as a main scene; and
      a plurality of types of second scenes, each second scene of the second scenes being for increasing a presentation effect of the first scene and being a selection candidate of a scene to be reproduced in combination with the first scene,
   wherein the storage medium stores:
      first scene specification information specifying the first scene, including time information indicating a storage position of the first scene as a storage time, and including pieces of situation information, each piece of situation information, of the pieces of situation information, indicating a situation of a scene relating to the first scene;
      a plurality of pieces of second scene specification information, each respective piece of second scene specification information, of the plurality of pieces of second scene specification information, specifying a respective second scene of the second scenes, including time information indicating a storage position of the respective second scene as a storage time, and including a piece of identification information of pieces of identification information, such that each piece of identification information, of the pieces of identification information, identifies one of the plurality of types of the second scenes; and
      a selection table indicating a correspondence between the pieces of situation information and the pieces of identification information, and
   wherein the program causes the video editing device to execute a method comprising:
      acquiring the first scene specification information;
      selecting, from the selection table, one or more pieces of the identification information in correspondence with a piece of situation information, of the pieces of situation information, included in the acquired first scene specification information; and
      extracting, as one or more pieces of information each specifying a second scene, of the second scenes, to be reproduced in combination with the first scene specified by the acquired first scene specific information, one or more pieces of second scene specification information, of the plurality of pieces of second scene specification information, specifying a second scene, of the second scenes, that (i) matches a type identified by the selected one or more pieces of identification information and (ii) has a storage time closest to the storage time of the first scene.

* * * * *